United States Patent
Xiang et al.

(10) Patent No.: US 11,303,559 B1
(45) Date of Patent: Apr. 12, 2022

(54) METHOD, APPARATUS AND COMPUTER STORAGE MEDIUM FOR DEADLOCK-FREE ADAPTIVE ROUTING IN TWO-DIMENSIONAL MESH NETWORK BASED ON THE OVERLAPPING VIRTUAL NETWORK PARTITIONING SCHEME

(71) Applicant: TSINGHUA UNIVERSITY, Beijing (CN)

(72) Inventors: Dong Xiang, Beijing (CN); Yuan Cai, Beijing (CN); Xiang Ji, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/184,751

(22) Filed: Feb. 25, 2021

(51) Int. Cl.
*G06F 15/16* (2006.01)
*H04L 45/00* (2022.01)
*H04L 45/44* (2022.01)
*H04L 45/586* (2022.01)
*H04L 45/30* (2022.01)
*H04L 45/74* (2022.01)

(52) U.S. Cl.
CPC ............ *H04L 45/22* (2013.01); *H04L 45/30* (2013.01); *H04L 45/44* (2013.01); *H04L 45/586* (2013.01); *H04L 45/74* (2013.01)

(58) Field of Classification Search
CPC ......... H04L 45/22; H04L 45/30; H04L 45/44; H04L 45/586; H04L 45/74; H04L 45/24; H04L 12/66; H04L 49/1576; H04L 12/28; H04L 47/12
USPC ........................................................ 709/238
See application file for complete search history.

(56) References Cited

U.S. PATENT DOCUMENTS 8,285,900 B2 * 10/2012 Gratz .................... H04L 47/10
710/100
8,593,960 B2 * 11/2013 Kauschke ............... H04L 45/06
370/231

FOREIGN PATENT DOCUMENTS

EP          3842987 A1 *   6/2021   ............ G06F 30/32

OTHER PUBLICATIONS

A partially adaptive routing algorithm for Benes network on chip Jing Zhang;Huaxi Gu 2009 2nd IEEE International Conference on Computer Science and Information Technology Year: 2009 | Conference Paper | Publisher: IEEE (Year: 2009).*

* cited by examiner

*Primary Examiner* — Oscar A Louie
*Assistant Examiner* — Oluwatosin M Gidado

(57) ABSTRACT

This patent provides a deadlock-free adaptive routing apparatus, method and computer storage medium for packets in two-dimensional mesh network based on the overlapping virtual network partitioning scheme, including: according to the offset between the source node and the destination node of the packet along the x-dimension or y-dimension, then use the x dimension and the y dimension to partition the two-dimensional mesh network into virtual networks; corresponding to each of the partitioned virtual networks, corresponding packet classes are respectively set, then merge virtual networks; based on the class the packet, inject the packet into the corresponding merged virtual network to route. This routing method balances utilization of the channels and improves efficiency of the data transmission.

15 Claims, 6 Drawing Sheets

---

If offsets along dimensions x and y are not zero, select one of the four virtual networks x*y-, x*y+, x-y*, and x+y* to inject the packet.
For packets of class 2 and 5, prevented turns must be avoided to provide full adaptivity Deliver the packet inside the selected virtual network.

If offsets along dimensions x and y are not zero, select one of the four virtual networks x*y-, x*y+, x-y*, and x+y* to inject the packet.
For packets of class 2 and 5, prevented turns must be avoided to provide full adaptivity
↓
Deliver the packet inside the selected virtual network.
Fig. 1
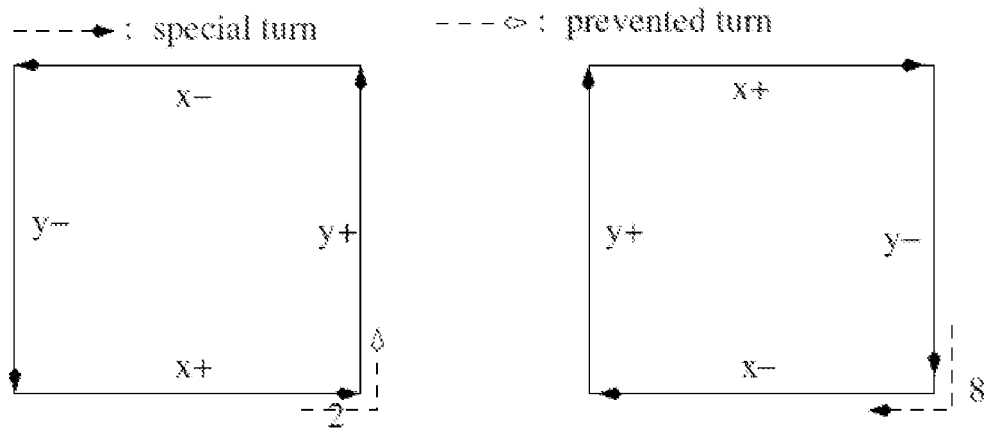
Fig. 2(a)
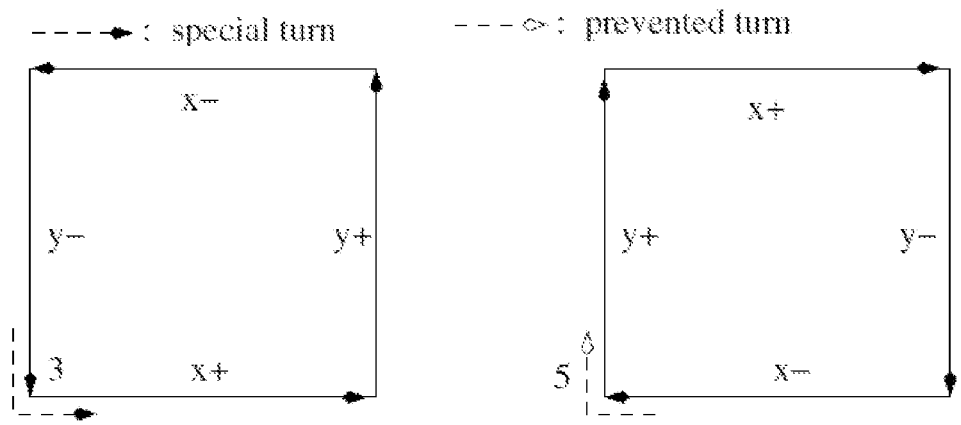
Fig. 2(b)

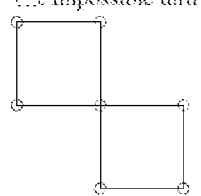 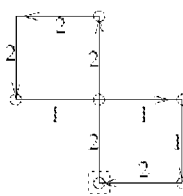 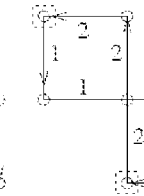 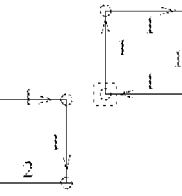 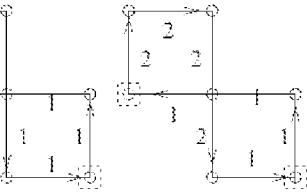
Fig. 3(a)　　Fig. 3(c)　　Fig. 3(d)　　Fig. 3(e)　　Fig. 3(f)
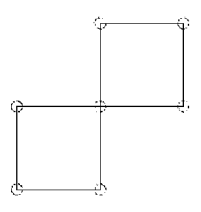 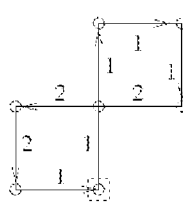 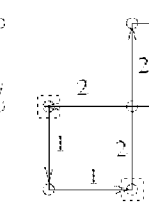 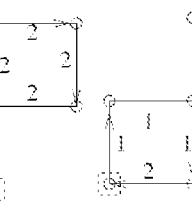 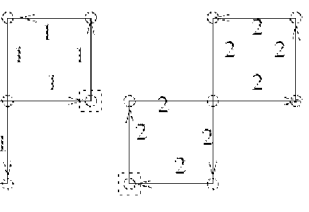
Fig. 3(b)　　Fig. 3(g)　　Fig. 3(h)　　Fig. 3(i)　　Fig. 3(j)
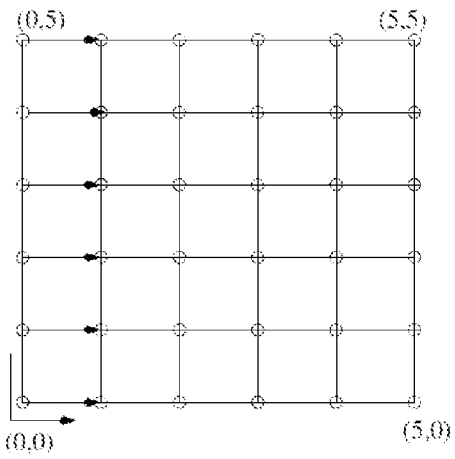 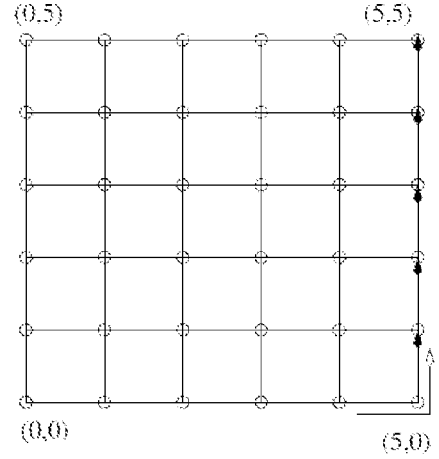
Fig. 4(a)　　　　　　　　　　　　Fig. 4(b)

METHOD, APPARATUS AND COMPUTER STORAGE MEDIUM FOR DEADLOCK-FREE ADAPTIVE ROUTING IN TWO-DIMENSIONAL MESH NETWORK BASED ON THE OVERLAPPING VIRTUAL NETWORK PARTITIONING SCHEME

FIELD OF THE INVENTION

The present disclosure generally relates to network-on-chips, and in particular to a deadlock-free adaptive routing method in two-dimensional mesh network based on the overlapping virtual network partitioning scheme.

BACKGROUND OF THE INVENTION

A direct network, as a common network topology, has been widely used in multi-processor systems and multi-computer systems. In a large-scale multi-core network-on-chip, each node has its own processor and local memory, and the system realizes connection between adjacent nodes through the direct network. Common network-on-chip topologies include two-dimensional (2D) mesh and torus, and so on.

The 2D mesh and torus topologies have been widely applied to the network-on-chip (NoC). However, under a condition of limited number of virtual channels, how to control deadlock-free adaptive routing in the torus network and mesh network is still a challenging problem for high performance NoC, because it is closely related to the amount of buffer and area overhead of the router.

At present, a Duato's protocol (DP) extends the deadlock-free basic routing algorithm to a fully adaptive deadlock-free routing algorithm by adding some additional adaptive channels, and realizes a fully adaptive deadlock-free routing algorithm in mesh and torus networks. In addition, Linder and Harden extend a concept of virtual channels to virtual networks. Each virtual network uses a different set of virtual channels to achieve system adaptivity, deadlock-free and fault tolerance.

However, existing fully adaptive routing algorithms generally have problems such as low channel utilization and a large number of used channels, which are not conducive to the improvement of data transmission efficiency.

SUMMARY OF THE INVENTION

Some simplification may be made in the following summary, which is intended to overcome the above-mentioned problems or at least partially solve the above-mentioned problems, provide a deadlock-free adaptive routing method in two-dimensional mesh network based on the overlapping virtual network partitioning scheme, which is used to effectively improve the channel utilization of the two-dimensional mesh network and reduce the required number of virtual channels, thereby effectively improve the efficiency of data transmission.

In a first embodiment, an adaptive routing method is provided for two-dimensional mesh networks-on-chip, the adaptive routing method comprising:

using x dimension and y dimension to partition a two-dimensional mesh network into eight virtual sub-networks, according to offsets between a source node and a destination node of a packet along the x dimension or the y dimension;

setting classes of the packet corresponding to each of the eight virtual sub-networks, then merging the eight virtual sub-networks into four virtual networks;

determining a class of the packet, according to the source node and destination node of the packet;

and, injecting the packet into one of the four virtual networks to route based on the class of the packet;

wherein, a step of using x dimension and y dimension to partition a two-dimensional mesh network into eight virtual sub-networks includes:

partitioning the two-dimensional mesh network into eight virtual sub-networks as follows: (1) x+y+(1), (2) x+y+(2), (3) x+y−(1), (4) x+y−(2), (5) x−y+(1), (6) x−y+(2), (7) x−y−(1), (8) x−y−(2); each conventional virtual network in a two-dimensional mesh appears twice in the eight sub-virtual networks, wherein packets are classified into eight classes according to the eight virtual sub-networks;

and, wherein a step of setting classes of the packets corresponding to each of the eight virtual sub-networks, includes:

according to the eight virtual sub-networks (1) x+y+(1), (2) x+y+(2), (3) x+y−(1), (4) x+y−(2), (5) x−y+(1), (6) x−y+(2), (7) x−y−(1), (8) x−y−(2), set classes of packets into eight classes;

considering a packet with offsets along x+ dimension and y+ dimension, setting the classes of the packet along x+ dimension and y+ dimension into class 1 and class 2, where the class 1 is x+y+(1), and the class 2 is x+y+(2);

considering a packet with offsets along x+ dimension and y− dimension, setting the classes of the packet along x+ dimension and y− dimension into class 3 and class 4, where the class 3 is x+y−(1), and the class 4 is x+y−(2);

considering a packet with offsets along x− dimension and y+ dimension, setting the classes of the packet along x− dimension and y+ dimension into class 5 and class 6, where the class 5 is x−y+(1), and the class 6 is x−y+(2);

and, considering a packet with offsets along x− dimension and y− dimension, setting the classes of the packet along x− dimension and y− dimension into class 7 and class 8, where the class 7 is x−y−(1), and the class 8 is x−y−(2);

and, wherein a step of merging the eight virtual sub-networks into four virtual networks includes:

merging the eight virtual sub-networks into four virtual networks as follows: (1) x*y−, (2) x*y+, (3) x−y*, (4) x+y*;

and, wherein a step of injecting the packet into one of the four virtual networks to route based on the class of the packet includes:

calculating a first offset along the x dimension and a second offset along the y dimension between the source node and the destination node of the packet;

wherein according to the first offset and the second offset, the packet is injected into a corresponding virtual network to route following these rules:

if the first offset and the second offset are both greater than zero, the packet is injected into x*y+ virtual network or x+y* virtual network;

if the first offset is greater than zero and the second offset is less than zero, the packet is injected into x*y− virtual network or x+y* virtual network;

if the first offset is less than zero and the second offset is greater than zero, the packet is injected into x*y+ virtual network or x−y* virtual network;

and, if the first offset and the second offset are both less than zero, the packet is injected into x*y− virtual network or x−y* virtual network;

and, after the step of merging the eight virtual sub-networks into four virtual networks, further comprising:

a physical x channel is assigned virtual channels $c_{x,1}$ and $c_{x,2}$, a y channel is assigned virtual channels $c_{y,1}$, and $c_{y,2}$;

then the four virtual networks are assigned these virtual channels: $x^*y-(c_{x,1},c_{y,1}-)$, $x^*y+(c_{x,1},c_{y,1}+)$, $x-y^*$ $(c_{x,2}-,c_{y,2})$, and $x+y^*$ $(c_{x,2}+,c_{y,2})$ for x and y channels in the four virtual networks;

the $x^*y-$ virtual networks and the $x^*y+$ virtual networks are assigned the virtual channels $c_{x,1}$ along the x dimension, and the $x-y^*$ virtual networks and the $x+y^*$ virtual networks are assigned the virtual channels $c_{y,2}$ along the y dimension;

and, before a step of injecting the packet into one of the virtual networks to route based on the class of the packet further comprising:

setting deadlock-free routing algorithm rules for the packet to route in the virtual network;

and, according to the class of the packet and the deadlock-free routing algorithm rules, any packet can be routed with full adaptivity in the four virtual networks.

In a second embodiment, an apparatus is provided for two-dimensional mesh networks-on-chip, the apparatus comprising: a data storage; and a processor communicatively connected to the data storage, the processor being configured to implement steps of the method of the present disclosure.

In a third embodiment, an adaptive routing computer storage medium is provided for two-dimensional mesh networks-on-chip, which, when executed by computer, cause the computer to perform the steps of the method of the present disclosure.

BRIEF DESCRIPTION OF THE DRAWINGS

In order to explain the embodiment of the present disclosure or the technical solutions in state of the art more clearly, the following will briefly introduce figures that need to be used in the description of state of the art and the embodiment.

FIG. 1 shows a schematic flowchart of the adaptive routing method for packets in the two-dimensional mesh network provided by the embodiment of the present disclosure;

FIG. 2(a)-2(b) show the channel utilization for the adaptive routing method for packets in the two-dimensional mesh network provided by the embodiment of the present disclosure; two prevented turns are two special turns are set while full adaptivity is provided;

FIG. 3(a)-3(j) show acyclic channel dependency by the adaptive routing method for packets in the two-dimensional mesh network provided by the embodiment of the present disclosure;

FIG. 4(a)-4(b) show the correctness of deadlock freedom of the adaptive routing method for packets in the two-dimensional Mesh network provided by the embodiment of the present disclosure;

DETAILED DESCRIPTION OF EMBODIMENTS OF THE INVENTION

Figure 5:
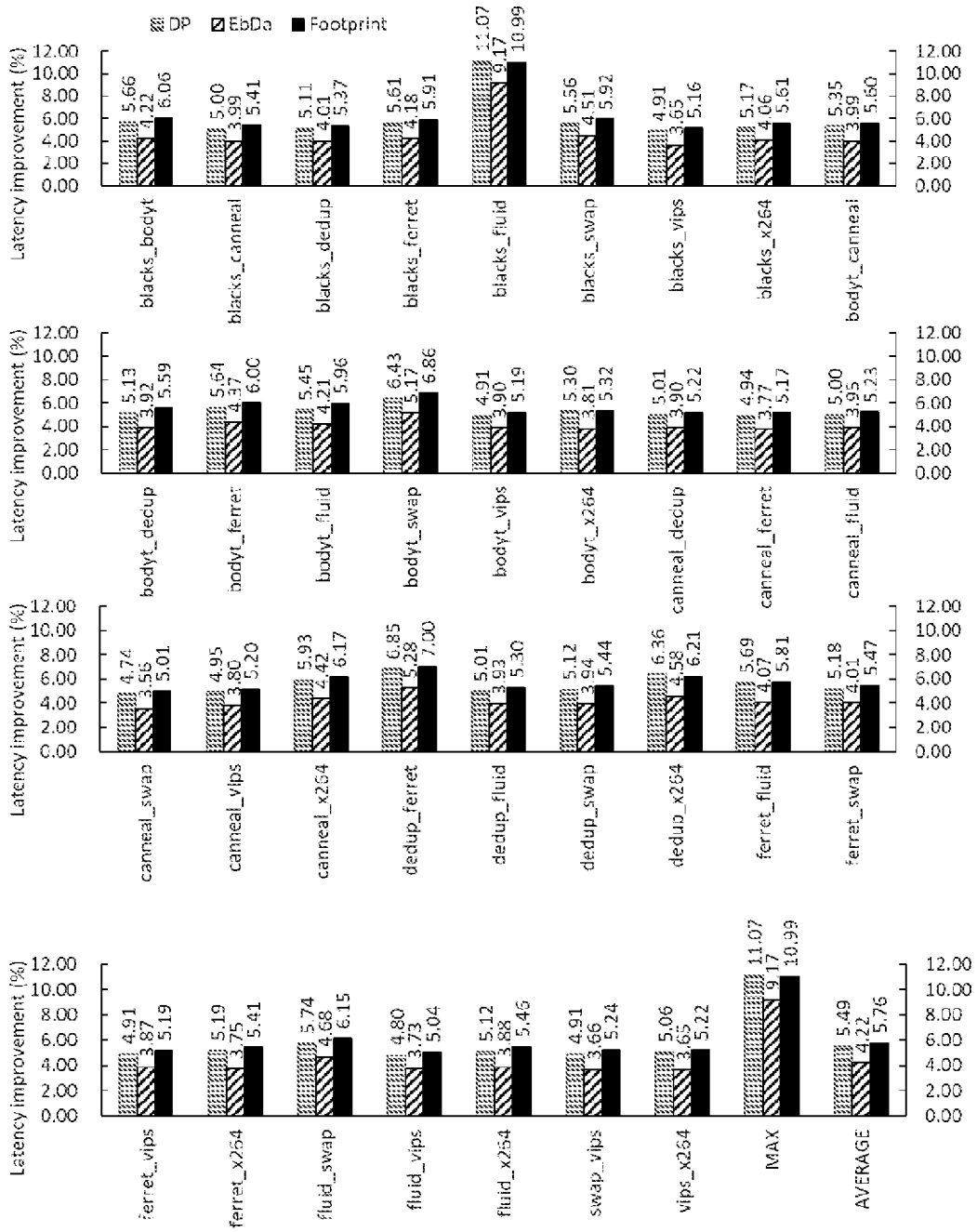
FIG. 5 shows the performance improvement (percentage) between the adaptive routing method in the two-dimensional mesh network provided by the embodiment of the present disclosure and Duato's protocol, EbDa, and Footprint.

FIG. 1 shows a flowchart of process for routing a network-on-chip packet using the deadlock-free adaptive routing algorithm of the present disclosure. As shown in FIG. 1, the method includes:

according to the offset between the source node and the destination node of the packet along the x dimension or y dimension, use the x dimension and the y dimension to partition the two-dimensional mesh network into eight virtual sub-networks;

If the sum of the offset in the x dimensional and y dimensional directions is equal to zero, the routing is finished.

Corresponding to each of the virtual sub-networks, corresponding packet's classes are respectively set, then the virtual sub-networks are merged, wherein a step of setting classes of the packets corresponding to each of the eight virtual sub-networks, includes:

considering a packet with offsets along x+ dimension and y+ dimension, setting the classes of the packet along x+ dimension and y+ dimension 1 into class 1 and class 2, where class 1 is x+y+(1), and class 2 is x+y+(2);

considering a packet with offsets along x+ dimension and y− dimension, setting the classes of the packet along x+ dimension and y− dimension into class 3 and class 4, where class 3 is x+y−(1), and class 4 is x+y−(2);

considering a packet with offsets along x− dimension and y+ dimension, setting the classes of the packet along x− dimension and y+ dimension into class 5 and class 6, where class 5 is x−y+(1), and class 6 is x−y+(2);

and, considering a packet with offsets along x− dimension and y− dimension, setting the classes of the packet along x− dimension and y− dimension into class 7 and class 8, where class 7 is x−y−(1), and class 8 is x−y−(2).

There eight virtual sub-networks are: (1) x+y+(1), (2) x+y+(2), (3) x+y−(1), (4) x+y−(2), (5) x−y+(1), (6) x−y+(2), (7) x−y−(1), (8) x−y−(2).

After merging these virtual sub-networks, four virtual networks are obtained as follow: $x^*y-(4, 8)$, $x^*y+(2, 6)$, $x-y^*(5, 7)$, $x+y^*(1, 3)$, where the numbers in the brackets are the number of the virtual sub-networks or the classes of the packet Based on the source node and destination node, the class of the packet is determined, then make the packet fall into the corresponding virtual network to route.

Compute the offset between the source node and the destination node in the x dimensional and y dimensional directions, which called the first offset and the second offset, respectively;

If the first offset and the second offset are both greater than zero, the packet is injected into the $x^*y+$ virtual network or $x+y^*$ virtual network;

If the first offset is greater than zero and the second offset is less than zero, the packet is injected into the $x^*y-$ virtual network or $x+y^*$ virtual network;

If the first offset is less than zero and the second offset is greater than zero, the packet is injected into the $x^*y+$ virtual network or $x-y^*$ virtual network;

If the first offset and the second offset are both less than zero, the packet is injected into the $x^*y-$ virtual network or $x-y^*$ virtual network.

The physical x channel is assigned virtual channels $c_{x,1}$ and $c_{x,2}$, the y channel is assigned virtual channels $c_{y,1}$, $c_{y,2}$; The following virtual channel assignment, $x^*y-(c_{x,1},c_{y,1}-)$, $x^*y+(c_{x,1},c_{y,1}+)$, $x-y^*$ $(c_{x,2}-,c_{y,2})$, and $x+y^*$ $(c_{x,2}+,c_{y,2})$ for x and y channels in the four merged virtual networks. As has been noted, the x*y− and x*y+ virtual networks are assigned the same virtual channels $c_{x,1}$ along dimension x, and the x−y* and x+y* virtual networks are assigned the same virtual channels $c_{y,2}$ along dimension y.

According to the eight virtual sub-networks (1) x+y+(1), (2) x+y+(2), (3) x+y−(1), (4) x+y−(2), (5) x−y+(1), (6) x−y+(2), (7) x−y−(1), (8) x−y−(2), set classes of packets as 1, 2, . . . , 8. Make the following sets for the deadlock-free routing algorithm, where two prevented turns and two special turns are set:

Packets of class 2 in the virtual network (VN) (x*y+) of the first group are not allowed to turn to a $c_{y,1}$+ channel from a $c_{x,1}$+ channel;

Packets of class 5 in the virtual network (x−y*) of the second group are not allowed to turn to a $c_{y,2}$+ channel from a $c_{x,2}$− channel;

Packets of class 3 in the virtual network (x+y*) of the second group turn from a $c_{y,2}$− channel to a $c_{x,1}$+ channel, first, they change the channel to the merged virtual network of the first group, and then when returning back to the y− direction via a $c_{y,2}$− channel, change the channel again to return back to the merged virtual network of the second group;

Packets of class 8 in the virtual network (x*y−) of the first group turn from a co-channel to a $c_{x,2}$− channel, first, they change the channel to the merged virtual network of the second group, and then when returning back to the y-direction via a co-channel, change the channel again to return back to the merged virtual network of the first group.

FIG. 2(a) and FIG. 2(b) present setting of prevented turns and special turns.

Any packets with non-zero offset along directions x+ and y+ can be injected into VN x*y+ or x+y*. We inject the packets into x+y* to avoid the prevented turn as shown in FIG. 2(a). Any packets with non-zero offset along directions y+ and x− can be injected into VN x*y+ or x−y*, however, our method injects the packets into VN x*y+ to avoid the prevented turn as presented in FIG. 2(b). All packets can be delivered with full adaptivity.

As shown in FIG. 2a-2b, our method also sets two special turns as shown in FIG. 2. Special turns are not really prevented turns. They introduce no constraints. Packets of class 8, that occupy a cy,1− channel, turn to cx,2− instead of cx,1−, which turn back to cy,1− when turning back from a cx,2− to a y− channel. Packets of class 3 occupy a cy,2− channel turn to cx,1+ instead of cx,2+, which turn back to cy,2− when turning back from a cx,1+ to a y− channel. As shown in FIG. 2(a)-2(b), a packet falls into the VN x+y* can be delivered with full adaptivity. Any packet inside VN x+y* can also be delivered with full adaptivity although a packet of class 3 is involved in a special turn. All other classes of packets can also be delivered with full adaptivity. Therefore, the proposed new VN scheme provides full adaptivity in fault-free 2D meshes for all packets.

The step of setting safety information of each virtual network specifically includes: any fault-free node is set to unsafe in a virtual network if it has two faulty or unsafe neighbors along dimensions x and y. Each fault-free node keeps its states in four different virtual networks. In addition, each fault-free node keeps safety information of its fault-free neighbors in all four virtual networks.

Calculate offset along dimensions x and y which are the destination node relative to the source node. The first offset is $x_{offset}=x_d-x_s$, the second offset is $y_{offset}=y_d-y_s$, where $(x_s,y_s)$ and $(x_d,y_d)$ are the coordinates of the source node and destination node, respectively.

wherein when a packet falls in x*y− virtual network, it is delivered by using a deadlock-free fully adaptive routing, that includes:

if $x_{offset}<0$ and $y_{offset}<0$, and the packet occupies a $c_{y,1}$− channel, then the next hop is a $c_{x,2}$− channel or a $c_{y,2}$− channel;

if $x_{offset}<0$ and $y_{offset}<0$, and the packet occupies a $c_{x,1}$− channel, then the next hop is a $c_{x,1}$− channel or a $c_{y,1}$− channel;

if $x_{offset}<0$ and $y_{offset}<0$, and the packet occupies a $c_{x,2}$− channel, then the next hop is a $c_{x,2}$− channel or a $c_{y,1}$− channel;

if $x_{offset}>0$ and $y_{offset}<0$, then the next hop is a $c_{x,1}$+ channel or a $c_{y,1}$− channel;

if $x_{offset}=0$ and $y_{offset}<0$, then the next hop is a $c_{y,1}$− channel;

if $x_{offset}>0$ and $y_{offset}=0$, then the next hop is a $c_{x,1}$+ channel;

and, if $x_{offset}<0$ and $y_{offset}=0$, and packet of class 8 occupies a $c_{y,1}$− channel or a $c_{x,2}$− channel, then the next hop is a $c_{x,2}$− channel; otherwise the next hop is $c_{x,1}$−;

wherein when a packet falls in x*y+ virtual network, it is delivered by using a deadlock-free adaptive routing, that includes:

if $x_{offset}>0$ and $y_{offset}>0$, and the packet occupies a $c_{x,1}$ channel, then the next hop is a $c_{x,1}$+ channel; otherwise, the packet occupies a $c_{y,1}$+ channel, then the next hop is a $c_{x,1}$+ channel or a $c_{y,1}$+ channel;

if $x_{offset}<0$ and $y_{offset}>0$, then the next hop is a $c_{x,1}$− channel or a $c_{y,1}$+ channel;

if $x_{offset}=0$ and $y_{offset}>0$, then the next hop is a $c_{y,1}$+ channel;

if $x_{offset}<0$ and $y_{offset}=0$, then the next hop is a $c_{x,1}$− channel;

and, if $x_{offset}>0$ and $y_{offset}=0$, then the next hop is a $c_{x,1}$+ channel;

wherein when a packet falls in x−y* virtual network, it is delivered by using a deadlock-free adaptive routing, that includes:

if $x_{offset}<0$ and $y_{offset}>0$, and the packet occupies a $c_{x,2}$− channel, then the next hop is a $c_{x,2}$− channel; otherwise, the packet occupies a $c_{y,2}$+ channel, then the next hop is a $c_{x,2}$− channel or a $c_{y,2}$+ channel;

if $x_{offset}<0$ and $y_{offset}<0$, then the next hop is a $c_{x,2}$− channel or a $c_{y,2}$− channel;

if $x_{offset}=0$ and $y_{offset}<0$, then the next hop is a $c_{y,2}$− channel;

and, if $x_{offset}<0$ and $y_{offset}=0$, then the next hop is a $c_{x,2}$− channel;

wherein when a packet falls in x+y* virtual network, it is delivered by using a deadlock-free fully adaptive routing, that includes:

if $x_{offset}>0$ and $y_{offset}<0$, and the packet occupies a $c_{y,2}$− channel, then the next hop is a $c_{x,1}$+ channel or a $c_{y,2}$− channel;

if $x_{offset}>0$ and $y_{offset}<0$, and packet of class 3 occupies a $c_{x,2}$+ channel, then the next hop is a $c_{x,2}$+ channel or a $c_{y,2}$− channel;

if $x_{offset}>0$ and $y_{offset}<0$, and the packet occupies a $c_{x,1}$+ channel, then the next hop is a $c_{x,1}$+ channel or a $c_{y,2}$− channel;

if $x_{offset}>0$ and $y_{offset}>0$, then the next hop is a $c_{x,2}$+ channel or a $c_{y,2}$+ channel;

if $x_{offset}=0$ and $y_{offset}<0$, then the next hop is a $c_{y,2}$− channel;

if $x_{offset}=0$ and $y_{offset}>0$, then the next hop is a $c_{y,2}$+ channel;

and, if $x_{offset}>0$ and $y_{offset}=0$, and packet of class 3 occupies a $c_{y,2}-$ channel or a $c_{x,1}+$ channel, then the next hop is a $c_{x,1}+$ channel; otherwise the next hop is a $c_{x,2}+$ channel.

The embodiments of the present disclosure respectively correspondingly perform different fault-tolerant fully adaptive routing according to the virtual network which the packet falls into.

Calculate offset along dimensions x and y which are destination node relative to source node. The first offset is $x_{offset}=x_d-x_s$, the second offset is $y_{offset}=y_d-y_s$, where (xs,ys) and (xd,yd) are the coordinates of the source node and destination node, respectively.

When packets fall in x*y− virtual network, they are delivered by using fault-tolerant adaptive routing, that includes:

If $x_{offset}<0$ and $y_{offset}<0$, and the packet occupies a cy,1− channel, moreover, both neighbors along the minimum paths of x− and y− are safe, then the next hop is a $c_{x,2}-$ channel. or a $c_{y,1}-$ channel. The packet is delivered along the remaining direction if one of the neighbors is unsafe or faulty;

If $x_{offset}<0$ and $y_{offset}<0$, and the packet occupies a $c_{x,1}-$ channel, moreover, both neighbors along the minimum paths of x− and y− are safe, then the next hop is a $c_{x,1}-$ channel or a $c_{y,1}-$ channel. The packet is delivered along the remaining direction if one of the neighbors is unsafe or faulty;

If $x_{offset}<0$ and $y_{offset}<0$, and the packet occupies a cx,2− channel, moreover, both neighbors along the minimum paths of x− and y− are safe, then the next hop is a $c_{x,2}-$ channel or a $c_{y,1}-$ channel. The packet is delivered along the remaining direction if one of the neighbors is unsafe or faulty;

If $x_{offset}>0$ and $y_{offset}<0$, and both neighbors along the minimum paths of x+ and y− are safe, then the next hop is a $c_{x,1}+$ or a $c_{y,1}-$ channel. The packet is delivered along the remaining direction if one of the neighbors is unsafe or faulty;

If $x_{offset}=0$ and $y_{offset}<0$, and the neighbor along the minimum paths of y− is safe, then the next hop is a $c_{y,1}-$ channel.

If $x_{offset}>0$ and $y_{offset}=0$, and the neighbor along the minimum paths of x+ is safe, then the next hop is a $c_{x,1}+$ channel.

If $x_{offset}<0$ and $y_{offset}=0$, and the packet of class 8 occupies a $c_{x,2}-$ or a $c_{y,1}-$ channel, moreover, the neighbor along the minimum paths of x− is safe, then the next hop is a $c_{x,2}-$ channel; otherwise, the neighbor along the minimum paths is safe, then the next hop is a $c_{x,1}-$ channel.

When the minimum path neighbors are unsafe, and the packet occupies an x channel, the packet turns to the virtual network x*y+; if the minimum path neighbors are unsafe, and the packet occupies a y channel in this case, misroute the packet to a x channel until the y− channel is available, then the packet routes along the minimum path in the y− direction.

When packets fall in x*y+ virtual network, they are delivered by using fault-tolerant adaptive routing, that includes:

If $x_{offset}>0$ and $y_{offset}>0$, and the packet occupies a $c_{x,1}+$ channel, moreover, both neighbors along the minimum paths of x+ and y+ are safe, then the next hop is a $c_{x,1}+$ channel. Otherwise, if the packet does not occupy a $c_{x,1}+$ channel, then the next hop is a $c_{x,1}+$ or a $c_{y,1}+$ channel, and the packet is delivered along the remaining direction if one of the neighbors is unsafe or faulty;

If $x_{offset}<0$ and $y_{offset}>0$, and, both neighbors along the minimum paths of x− and y+ are safe, then the next hop is a $c_{x,1}-$ or a $c_{y,1}+$ channel. The packet is delivered along the remaining direction if one of the neighbors is unsafe or faulty;

If $x_{offset}=0$ and $y_{offset}>0$, and the neighbor along the minimum paths of y+ is safe, then the next hop is a $c_{y,1}+$ channel.

If $x_{offset}>0$ and $y_{offset}=0$, and the neighbor along the minimum paths of x+ is safe, then the next hop is a $c_{x,1}+$ channel.

If $x_{offset}<0$ and $y_{offset}=0$, and the neighbor along the minimum paths of x− is safe, then the next hop is a $c_{x,1}-$ channel.

When the minimum path neighbors are unsafe, and the packet occupies an x channel, the packet turns to the virtual network x*y−; if the minimum path neighbors are unsafe, and the packet occupies a y channel in this case, misroute the packet to a x channel until the y+ channel is available, then the packet routes along the minimum path in the y+ direction.

When packets fall in x−y* virtual network, they are delivered by using fault-tolerant adaptive routing, that includes:

If $x_{offset}<0$ and $y_{offset}>0$, and the packet occupies a $c_{x,2}-$ channel, moreover, both neighbors along the minimum paths of x− and y+ are safe, then the next hop is a $c_{x,2}-$ channel. Otherwise, if the packet does not occupy a cx,2− channel, then the next hop is a $c_{x,2}-$ or a $c_{y,2}+$ channel, and the packet is delivered along the remaining direction if one of the neighbors is unsafe or faulty;

If $x_{offset}<0$ and $y_{offset}<0$, and, both neighbors along the minimum paths of x− and y− are safe, then the next hop is a $c_{x,2}-$ or a $c_{y,2}-$ channel. The packet is delivered along the remaining direction if one of the neighbors is unsafe or faulty;

If $x_{offset}=0$ and $y_{offset}>0$, and the neighbor along the minimum paths of y+ is safe, then the next hop is a $c_{y,2}+$ channel.

If $x_{offset}=0$ and $y_{offset}<0$, and the neighbor along the minimum paths of y− is safe, then the next hop is a $c_{y,2}-$ channel.

If $x_{offset}<0$ and $y_{offset}=0$, and the neighbor along the minimum paths of x− is safe, then the next hop is a $c_{x,2}-$ channel.

When the minimum path neighbors are unsafe, and the packet occupies a y channel, the packet turns to the virtual network x+y*; if the minimum path neighbors are unsafe, and the packet occupies an x channel in this case, misroute the packet to a y channel until the x− channel is available, then the packet routes along the minimum path in the x− direction.

When packets fall in x+y* virtual network, they are delivered by using fault-tolerant adaptive routing, that includes:

If $x_{offset}>0$ and $y_{offset}<0$, and the packet occupies a $c_{y,2}-$ channel, moreover, both neighbors along the minimum paths of x+ and y− are safe, then the next hop is a $c_{x,1}+$ or a $c_{y,2}-$ channel. The packet is delivered along the remaining direction if one of the neighbors is unsafe or faulty;

If $x_{offset}>0$ and $y_{offset}<0$, and the packet occupies a $c_{x,1}+$ channel, moreover, both neighbors along the minimum paths of x+ and y− are safe, then the next hop is a $c_{x,1}+$ or a $c_{y,2}-$ channel. The packet is delivered along the remaining direction if one of the neighbors is unsafe or faulty;

If $x_{offset}>0$ and $y_{offset}<0$, and the packet occupies a $c_{x,2}+$ channel, moreover, both neighbors along the minimum paths of x+ and y− are safe, then the next hop is a $c_{x,2}+$ or a $c_{y,2}-$ channel. The packet is delivered along the remaining direction if one of the neighbors is unsafe or faulty;

If $x_{offset}>0$ and $y_{offset}>0$, and both neighbors along the minimum paths of x+ and y+ are safe, then the next hop is a $c_{x,2}+$ or a $c_{y,2}+$ channel. The packet is delivered along the remaining direction if one of the neighbors is unsafe or faulty;

If $x_{offset}=0$ and $y_{offset}<0$, and the neighbor along the minimum paths of y− is safe, then the next hop is a $c_{y,2}-$ channel.

If $x_{offset}=0$ and $y_{offset}>0$, and the neighbor along the minimum paths of y+ is safe, then the next hop is a $c_{y,2}+$ channel.

If $x_{offset}>0$ and $y_{offset}=0$, and the packet of class 3 occupies a $c_{x,1}+$ or a $c_{y,2}-$ channel, moreover, the neighbor along the minimum paths of x+ is safe, then the next hop is a $c_{x,1}+$ channel; otherwise, the packet does not occupy the above stated channel, and the neighbor along the minimum paths is safe, then the next hop is a $c_{x,2}+$ channel.

When the minimum path neighbors are unsafe, and the packet occupies a y channel, the packet turns to the virtual network x−y*; if the minimum path neighbors are unsafe, and the packet occupies an x channel in this case, misroute the packet along y direction until a minimum x+ channel is available, then the packet routes along the minimum path in the x+ direction.

FIG. 3(a)-3(j) show some potential more complex cyclic channel dependencies. All the possible kinds of cyclic channel dependencies are presented. There exists at least one impossible turn in each case. As shown in FIG. 3(a), assume that a packet at a y− channel in x+y* is waiting for the $c_{x,1}+$ channel because of the special turn for packets of class 3, which is occupied by a packet in the virtual network x*y−. The x+ channel dependency chain turns to a $c_{y,1}-$ channel until a packet is waiting for a $c_{y,1}-$ channel, which can turn to a $c_{x,2}-$ channel because of the special turn for packets of class 8. The packet occupies a $c_{x,2}-$ channel cannot turn to y+ channel because of the prevented turn for packets of class 5. That makes the potential cyclic channel dependency cannot be established. Therefore, all these kinds of potential cyclic channel dependencies as shown in FIG. 3(a)-3(j) are impossible.

FIG. 4(a)-4(b) present correctness of the deadlock freedom for the proposed routing algorithm. FIG. 4(a)-4(b) show why the deadlock freedom claim is correct for virtual networks x+y* and x*y+. It is similar for the other two virtual networks. A channel, that can be only a source for a channel dependency, can be deleted from the virtual network; a channel, that can be only the sink of a channel dependency, can be deleted similarly.

Let us consider VN x+y* as shown in FIG. 4(a). The x+ channel between (0,0) and (1,0) does not receive any packet from any other router, therefore, the x+ between (0,0) and (1,0) can be removed. The y+ channel between (0,0) and (0,1) can be deleted because of the same reason. The x+ channel between (0,1) and (1,1) can be deleted while the router at (0,1) and the y+ channel between (0,1) and (0,2) can also be removed. Similarly, all y+ channels in the leftmost column and the x+ channels between the leftmost two columns can be removed. The y− channel between (0,5) and (0,4) can be removed because it can be source of any channel dependencies. Similarly, all y− channels in the leftmost column can be removed. This process continues until all channels in VN x+y* can be removed. Therefore, the proposed routing algorithm Overlap is thus deadlock-free in VN x+y*.

Let us consider VN x*y+ as shown in FIG. 4(b). The rightmost y+ channel between routers (5,0) and (5,1) does not receive any packet from any other router, therefore, the y+ channel between (5,0) and (5,1) can be removed because it can only be the source of a channel dependency. The x+ channel between (4,0) and (5,0) can be deleted because it can only be the sink of a channel dependency. This process continues until all x+ channels in the bottom row have been removed. After that, the x− channel between (4,0) and (5,0) can be removed because it can be only source of a channel dependency. This process continues until all x− channels in the bottom row have been removed. Therefore, all y+ channels from the bottom row can also be removed. All x+, x− and y+ channels in the VN x*y+ can be removed in this way. Therefore, the proposed routing algorithm Overlap in VN x*y+ is thus deadlock-free. Similarly, we can prove the routing algorithm Overlap is deadlock-free in VNs x−y* and x*y−.

FIG. 5 shows the performance comparison of the proposed method Overlap with DP under the PARSEC workloads. In all cases, combinations of two traces are used to evaluate the performance of Overlap and DP. The notation "blacks bodyt" represents a combination of two traces "blackscholes" and "bodytrack". "MAX" represents the maximum improvement percentage for the proposed Overlap algorithm over DP on average latency to deliver a packet for all combinations of traces. "AVERAGE" stands for the average improvement percentage for Overlap algorithm over DP on the average latency. It is found that the new method consistently works better than DP in all cases. The average latency improvement is no less than 4.74% in all cases. The maximum latency improvement of Overlap over DP is up to 11.07%.

FIG. 5 also presents performance comparison of the new method Overlap with EbDa under the PARSEC workloads. We present simulation results in VCT-switched 8×8 meshes, where each input port provides 2 VCs. When 2 VCs are provided, where each VC is assigned a separate buffer, and each buffer is enough to keep the whole packet. EbDa obtains slightly better results than DP in all cases. However, the new method Overlap consistently works better than EbDa in all cases. The least latency improvement over EbDa is 3.56%. The average and maximum latency improvement over EbDa is 4.21% and 9.17%, respectively.

FIG. 5 still presents performance comparison of the new method Overlap with Footprint under the PARSEC workloads. We still present simulation results in VCT-switched 8×8 meshes, where each input port provides 4 VCs. Simulation results for Overlap are obtained when 4 VCs are provided, where each VC is assigned one buffer, and each buffer is enough to keep the whole packet. Footprint obtains slightly better results than DP in all cases. However, the new method Overlap consistently works better than Footprint and DP in all cases. The least latency improvement over Footprint is 5.01% in all cases. The average and maximum latency improvement over Footprint is 5.74% and 10.99%, respectively.

Figure 6:
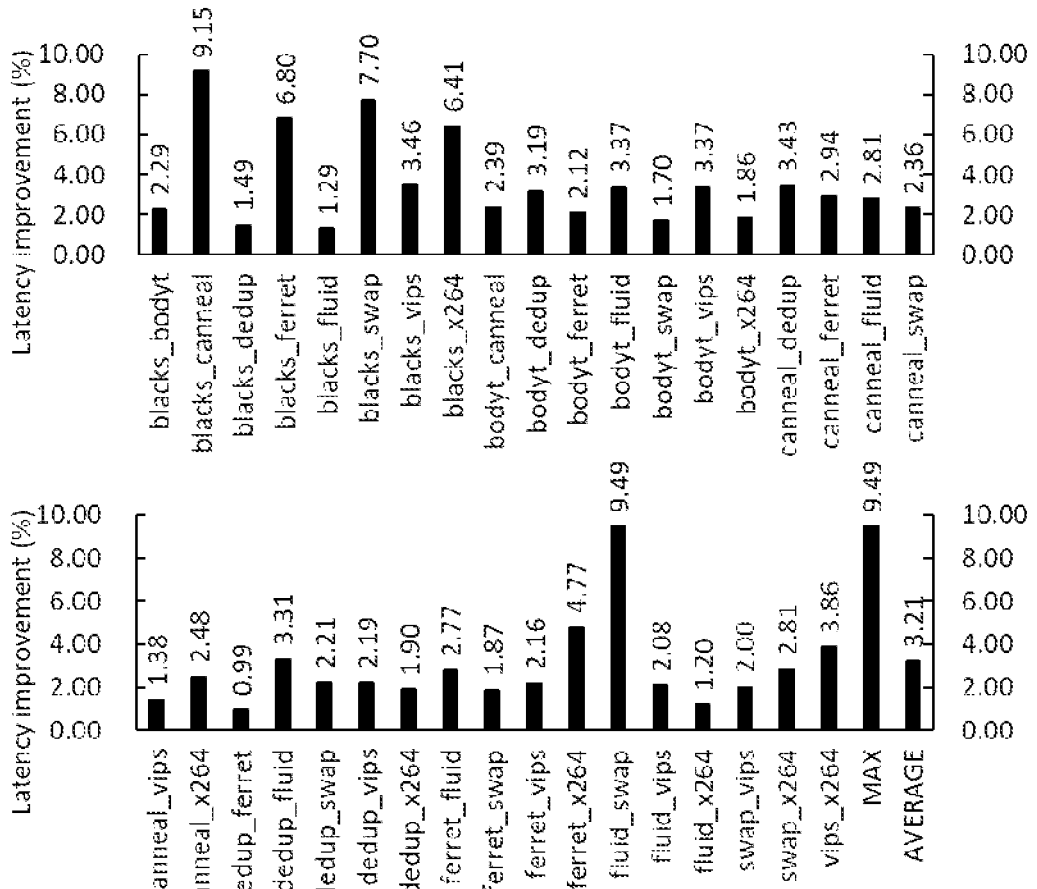
FIG. 6 shows the performance comparison of the adaptive routing method Overlap in the two-dimensional mesh network provided by the embodiment of the present disclosure.

In FIG. 6, Overlap_FT represents the fault-tolerant algorithm of the embodiment of the present disclosure. It can be seen from the figure that, in the failure situation, the algorithm of the embodiment of the present disclosure has a greater improvement in the average network delay than the Immunet algorithm for the PARSEC.

The Parsec benchmark results show that the fault-tolerant routing algorithm provided by the embodiment of the present disclosure is superior to the existing Immunet algorithm in data transmission efficiency, and has better performance than the existing routing algorithm.

Figure 7:
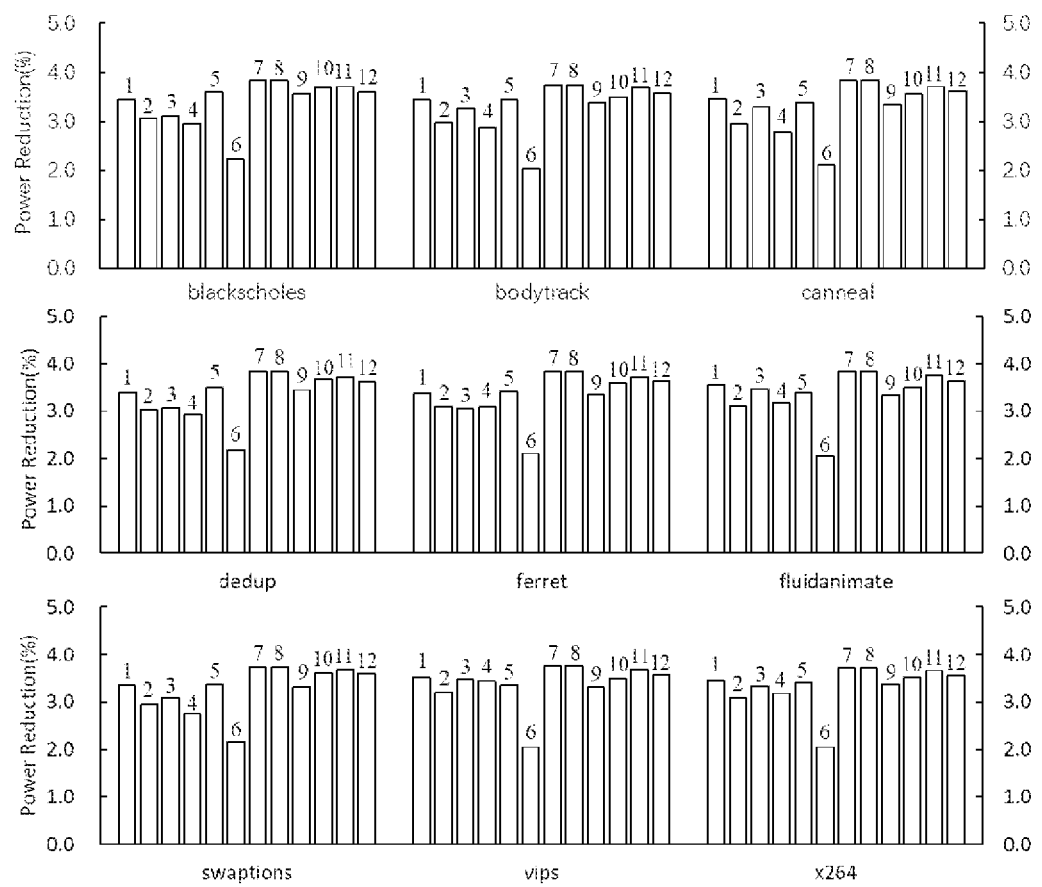
FIG. 7 presents power evaluation for the proposed routing algorithm, Duato's Protocol and EbDa algorithms under the original PARSEC workloads.

FIG. 7 presents the power evaluation for the proposed routing algorithm, DP and EbDa algorithms under the PARSEC workloads. Power is evaluated based on ORION3.0. Dynamic power and static power are considered in the power model. Both static and dynamic power includes power of input buffer, crossbar, switch allocator, virtual channel allocator, and router clock. We present power comparison with DP and EbDa algorithms on total power, power of input buffer, crossbar, switch allocator, virtual channel allocator, and router clock, respectively. Power reduction for input buffer, crossbar, switch allocator, virtual channel allocator, and router clock compared to DP and EbDa algorithms is similar to that of total power. The routing algorithm provided by the embodiment of the present disclosure obtains more power reduction compared to DP on total power than EbDa for all traces. It produces more input buffer, crossbar and clock power reduction compared to DP than EbDa for almost all traces. It produces almost the same arbiter power reduction for all cases compared to DP and EbDa. switch allocator, and virtual channel allocator than EbDa. It generates less link power reduction compared to DP than EbDa for all traces. It provides lower-power and better performance simultaneously compared to DP and EbDa algorithms in all cases.

Figure 8:
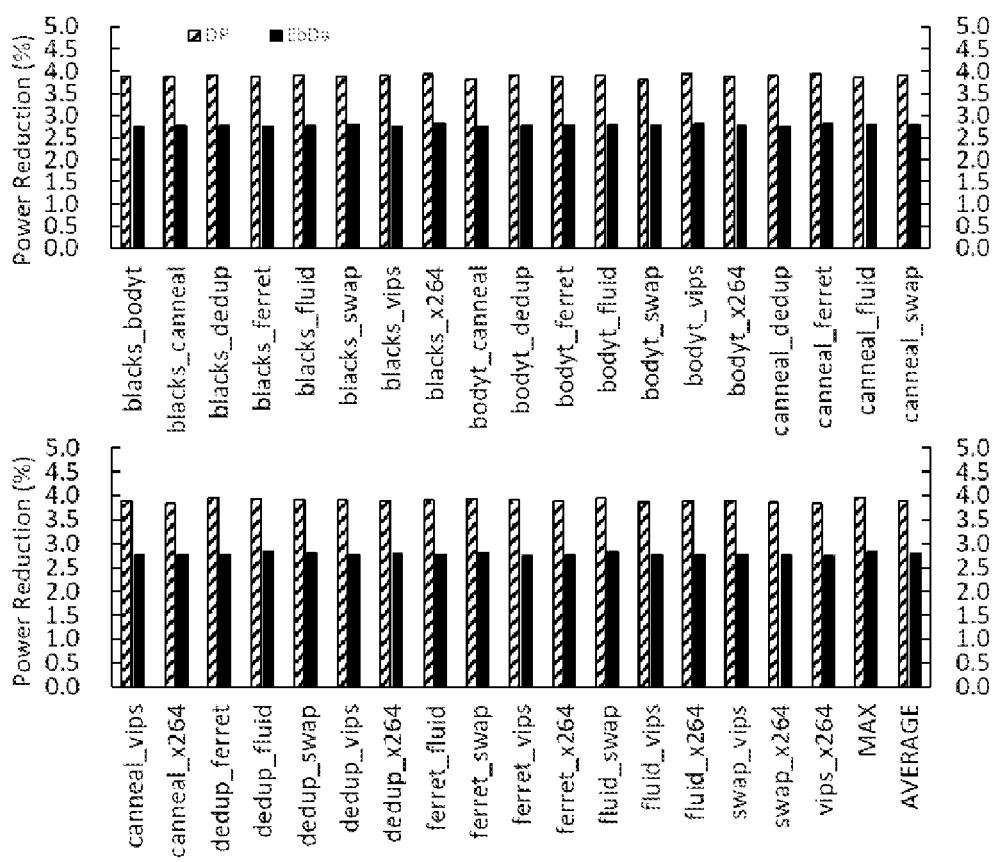
FIG. 8 presents power evaluation for the proposed routing algorithm, Duato's Protocol and EbDa algorithms under the combinations of the PARSEC workloads.

FIG. 8 presents the power evaluation for the proposed routing algorithm, DP and EbDa algorithms under the combinations of the PARSEC workloads. The routing algorithm provided by the embodiment of the present disclosure obtains more power reduction compared to DP on total power than EbDa for all combinations of traces.

An embodiment of the present disclosure provides an adaptive routing computer storage medium that stores a computer program for two-dimensional mesh networks-on-chip, which, when executed by computer, cause the computer to perform the adaptive routing method according to any of the foregoing method embodiments.

An embodiment of the present disclosure provides an adaptive routing apparatus for two-dimensional mesh networks-on-chip, the apparatus includes: processor, data storage coupled to the processor. The data storage stores appropriate ones of programs executable by the processor. The program when executed by the processor, implements the steps of the method according to the embodiments of the present disclosure.

In some embodiments, the apparatus also includes I/O interface, the I/O interface cooperates with processor.

In some embodiments, the processor may include resources such as processors/CPU cores, the I/O interface may include any suitable network interfaces, or the data storage may include memory or storage devices. Moreover the apparatus may be any suitable physical hardware configuration such as: one or more server(s), blades consisting of components such as processor, memory, network interfaces or storage devices. In some of these embodiments, the apparatus may include cloud network resources that are remote from each other.

In some embodiments, the apparatus may be virtual machine. In some of these embodiments, the virtual machine may include components from different machines or be geographically dispersed. For example, the data storage and the processor may be in two different physical machines.

When processor-executable programs are implemented on a processor, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional or custom, may also be included.

It should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. An adaptive routing method for two-dimensional mesh networks-on-chip, the adaptive routing method comprising:
    using x dimension and y dimension to partition a two-dimensional mesh network into eight virtual sub-networks, according to offsets between a source node and a destination node of a packet along the x dimension or the y dimension;
    setting classes of the packet corresponding to each of the eight virtual sub-networks, then merging the eight virtual sub-networks into four virtual networks;

determining a class of the packet, according to the source node and destination node of the packet;

and, injecting the packet into one of the four virtual networks to route based on the class of the packet;

wherein, a step of using x dimension and y dimension to partition a two-dimensional mesh network into eight virtual sub-networks includes:

partitioning the two-dimensional mesh network into eight virtual sub-networks as follows: (1) x+y+(1), (2) x+y+(2), (3) x+y−(1), (4) x+y−(2), (5) x−y+(1), (6) x−y+(2), (7) x−y−(1), (8) x−y−(2); each conventional virtual network in a two-dimensional mesh appears twice in the eight sub-virtual networks, wherein packets are classified into eight classes according to the eight virtual sub-networks;

and, wherein a step of setting classes of the packets corresponding to each of the eight virtual sub-networks, includes:

according to the eight virtual sub-networks (1) x+y+(1), (2) x+y+(2), (3) x+y−(1), (4) x+y−(2), (5) x−y+(1), (6) x−y+(2), (7) x−y−(1), (8) x−y−(2), set classes of packets into eight classes;

considering a packet with offsets along x+ dimension and y+ dimension, setting the classes of the packet along x+ dimension and y+ dimension into class 1 and class 2, where the class 1 is x+y+(1), and the class 2 is x+y+(2);

considering a packet with offsets along x+ dimension and y− dimension, setting the classes of the packet along x+ dimension and y− dimension into class 3 and class 4, where the class 3 is x+y−(1), and the class 4 is x+y−(2);

considering a packet with offsets along x− dimension and y+ dimension, setting the classes of the packet along x− dimension and y+ dimension into class 5 and class 6, where the class 5 is x−y+(1), and the class 6 is x−y+(2);

and, considering a packet with offsets along x− dimension and y− dimension, setting the classes of the packet along x− dimension and y− dimension into class 7 and class 8, where the class 7 is x−y−(1), and the class 8 is x−y−(2);

and, wherein a step of merging the eight virtual sub-networks into four virtual networks includes:

merging the eight virtual sub-networks into four virtual networks as follows: (1) x*y−, (2) x*y+, (3) x−y*, (4) x+y*;

and, wherein a step of injecting the packet into one of the four virtual networks to route based on the class of the packet includes:

calculating a first offset along the x dimension and a second offset along the y dimension between the source node and the destination node of the packet;

wherein according to the first offset and the second offset, the packet is injected into a corresponding virtual network to route following these rules:

if the first offset and the second offset are both greater than zero, the packet is injected into x*y+ virtual network or x+y* virtual network;

if the first offset is greater than zero and the second offset is less than zero, the packet is injected into x*y− virtual network or x+y* virtual network;

if the first offset is less than zero and the second offset is greater than zero, the packet is injected into x*y+ virtual network or x−y* virtual network;

and, if the first offset and the second offset are both less than zero, the packet is injected into x*y− virtual network or x−y* virtual network;

and, after the step of merging the eight virtual sub-networks into four virtual networks, further comprising:

a physical x channel is assigned virtual channels $c_{x,1}$ and $c_{x,2}$, a y channel is assigned virtual channels $c_{y,1}$ and $c_{y,2}$;

then the four virtual networks are assigned these virtual channels: x*y−($c_{x,1}, c_{y,1}-$), x*y+($c_{x,1}, c_{y,1}+$), x−y* ($c_{x,2}-, c_{y,2}$), and x+y* ($c_{x,2}+, c_{y,2}$) for x and y channels in the four virtual networks;

the x*y− virtual networks and the x*y+ virtual networks are assigned the virtual channels $c_{x,1}$ along the x dimension, and the x−y* virtual networks and the x+y* virtual networks are assigned the virtual channels $c_{y,2}$ along the y dimension;

and, before a step of injecting the packet into one of the virtual networks to route based on the class of the packet further comprising:

setting deadlock-free routing algorithm rules for the packet to route in the virtual network;

and, according to the class of the packet and the deadlock-free routing algorithm rules, any packet can be routed with full adaptivity in the four virtual network.

2. The method according to claim 1, wherein according to the eight virtual sub-networks: (1) x+y+(1), (2) x+y+(2), (3) x+y−(1), (4) x+y−(2), (5) x−y+(1), (6) x−y+(2), (7) x−y−(1), and (8) x−y−(2), set following rules for the deadlock-free routing algorithm, where two prevented turns and two special turns are set:

packets of the class 2 in the x*y+ virtual network of a first group are not allowed to turn to a $c_{y,1}+$ channel from a $c_{x,1}+$ channel;

packets of the class 5 in the x−y* virtual network of a second group are not allowed to turn to a $c_{y,2}+$ channel from a $c_{x,2}-$ channel;

packets of the class 3 in the x+y* virtual network of the second group turn from a $c_{y,2}-$ channel to a $c_{x,1}+$ channel, first, they change channel to the virtual network of the first group, and then when returning back to y− direction via the $c_{y,2}-$ channel, change channel again to return back to the virtual network of the second group;

and, packets of the class 8 in the x*y− virtual network of the second group turn from a $c_{y,1}-$ channel to a $c_{x,2}-$ channel, first, they change channel to the virtual network of the second group, and then when returning back to the y direction via the $c_{y,1}-$ channel, change channel again to return back to the virtual network of the first group.

3. The method according to claim 1, further comprising:
calculating offsets along x dimension and y dimension, which are the destination node relative to the source node, the first offset is $x_{offset}=x_d-x_s$, the second offset is $y_{offset}=y_d-y_s$, where $(x_s,y_s)$ and $(x_d,y_d)$ are coordinates of source node and destination node, respectively;

and, wherein when a packet falls in x*y− virtual network, it is delivered by using a deadlock-free fully adaptive routing, that includes:

if $x_{offset}<0$ and $y_{offset}<0$, and the packet occupies a $c_{y,1}-$ channel, then the next hop is a $c_{x,2}-$ channel or a $c_{y,2}-$ channel;

if $x_{offset}<0$ and $y_{offset}<0$, and the packet occupies a $c_{x,1}-$ channel, then the next hop is the $c_{x,1}-$ channel or the $c_{y,1}-$ channel;

if $x_{offset}<0$ and $y_{offset}<0$, and the packet occupies the $c_{x,2}-$ channel, then the next hop is the $c_{x,2}-$ channel or the $c_{y,1}-$ channel;

if $x_{offset}>0$ and $y_{offset}<0$, then the next hop is a $c_{x,1}+$ channel or the $c_{y,1}-$ channel;

if $x_{offset}=0$ and $y_{offset}<0$, then the next hop is the $c_{y,1}-$ channel;

if $x_{offset}>0$ and $y_{offset}=0$, then the next hop is the $c_{x,1}+$ channel;

and, if $x_{offset}<0$ and $y_{offset}=0$, and packet of the class 8 occupies the $c_{y,1}-$ channel or the $c_{x,2}-$ channel, then the next hop is the $c_{x,2}-$ channel; otherwise the next hop is the $c_{x,1}-$ channel;

and, wherein when a packet falls in the x*y+ virtual network, it is delivered by using a deadlock-free adaptive routing, that includes:

if $x_{offset}>0$ and $y_{offset}>0$, and the packet occupies the $c_{x,1}+$ channel, then the next hop is the $c_{x,1}+$ channel; otherwise, the packet occupies a $c_{y,1}+$ channel, then the next hop is the $c_{x,1}+$ channel or the $c_{y,1}+$ channel;

if $x_{offset}<0$ and $y_{offset}>0$, then the next hop is the $c_{x,1}-$ channel or the $c_{y,1}+$ channel;

if $x_{offset}=0$ and $y_{offset}>0$, then the next hop is the $c_{y,1}+$ channel;

if $x_{offset}<0$ and $y_{offset}=0$, then the next hop is the $c_{x,1}-$ channel;

and, if $x_{offset}>0$ and $y_{offset}=0$, then the next hop is the $c_{x,1}+$ channel;

and, wherein when a packet falls in the x−y* virtual network, it is delivered by using a deadlock-free adaptive routing, that includes:

if $x_{offset}<0$ and $y_{offset}>0$, and the packet occupies the $c_{x,2}-$ channel, then the next hop is the $c_{x,2}-$ channel; otherwise, the packet occupies a $c_{y,2}+$ channel, then the next hop is the $c_{x,2}-$ channel or the $c_{y,2}+$ channel;

if $x_{offset}<0$ and $y_{offset}<0$, then the next hop is the $c_{x,2}-$ channel or the $c_{y,2}-$ channel;

if $x_{offset}=0$ and $y_{offset}>0$, then the next hop is the $c_{y,2}+$ channel;

if $x_{offset}=0$ and $y_{offset}<0$, then the next hop is the $c_{y,2}-$ channel;

and, if $x_{offset}<0$ and $y_{offset}=0$, then the next hop is the $c_{x,2}-$ channel;

and, wherein when a packet falls in x+y* virtual network, it is delivered by using a deadlock-free fully adaptive routing, that includes:

if $x_{offset}>0$ and $y_{offset}<0$, and the packet occupies the $c_{y,2}-$ channel, then the next hop is the $c_{x,1}+$ channel or the $c_{y,2}-$ channel;

if $x_{offset}>0$ and $y_{offset}<0$, and packet of the class 3 occupies a $c_{x,2}+$ channel, then the next hop is the $c_{x,2}+$ channel or the $c_{y,2}-$ channel;

if $x_{offset}>0$ and $y_{offset}<0$, and the packet occupies the $c_{x,1}+$ channel, then the next hop is the $c_{x,1}+$ channel or the $c_{y,2}-$ channel;

if $x_{offset}>0$ and $y_{offset}>0$, then the next hop is the $c_{x,2}+$ channel or the $c_{y,2}+$ channel;

if $x_{offset}=0$ and $y_{offset}<0$, then the next hop is the $c_{y,2}-$ channel;

if $x_{offset}=0$ and $y_{offset}>0$, then the next hop is the $c_{y,2}+$ channel;

and, if $x_{offset}>0$ and $y_{offset}=0$, and packet of the class 3 occupies a $c_{y,2}-$ channel or the $c_{x,1}+$ channel, then the next hop is the $c_{x,1}+$ channel; otherwise the next hop is the $c_{x,2}+$ channel.

4. The method according to claim 1, further comprising: according to state of fault nodes in the two-dimensional mesh network, keep safety information of each of the four virtual networks, before injecting the packet into a corresponding virtual network for routing, and, based on the class of the packet and the safety information, the packet is injected into a corresponding virtual network for a deadlock-free fully adaptive fault-tolerant routing;

wherein a step of setting safety information of each virtual network includes: any fault-free node is set to unsafe in a virtual network, if it has two faulty or unsafe neighbors along x dimension and y dimension;

each fault-free node keeps its state in the four virtual networks;

in addition, each fault-free node keeps safety information of its fault-free neighbors in all the four virtual networks;

therefore, 16 bits data at most should be kept at each fault-free router in a two-dimensional mesh networks-on-chip.

5. The method according to claim 4, further comprising:

calculating offsets along x dimension and y dimension which are a destination node relative to a source node;

wherein the first offset is $x_{offset}=x_d-x_s$, the second offset is $y_{offset}=yd-ys$, where $(x_s,y_s)$ and $(x_d,y_d)$ are coordinates of the source node and the destination node, respectively;

wherein when a packet falls in the x*y− virtual network, it is delivered by using a fault-tolerant adaptive routing, that includes:

if $x_{offset}<0$ and $y_{offset}<0$, and the packet occupies a $c_{y,1}-$ channel, moreover, both neighbors along minimum paths of x− direction and y− direction are safe, then the next hop is a $c_{x,2}-$ channel or the $c_{y,1}-$ channel; the packet is delivered along remaining direction if one of the neighbors is unsafe or faulty;

if $x_{offset}<0$ and $y_{offset}<0$, and the packet occupies a $c_{x,1}-$ channel, moreover, both neighbors along minimum paths of the x− direction and the y− direction are safe, then the next hop is the $c_{x,1}-$ channel or the $c_{y,1}-$ channel; the packet is delivered along remaining direction if one of the neighbors is unsafe or faulty;

if $x_{offset}<0$ and $y_{offset}<0$, and the packet occupies the $c_{x,2}-$ channel, moreover, both neighbors along minimum paths of x− direction and y− direction are safe, then the next hop is the $c_{x,2}-$ channel or the $c_{y,1}-$ channel; the packet is delivered along remaining direction if one of the neighbors is unsafe or faulty;

if $x_{offset}>0$ and $y_{offset}<0$, and both neighbors along minimum paths of x+ direction and y− direction are safe, then the next hop is a $c_{x,1}+$ channel or the $c_{y,1}-$ channel; the packet is delivered along remaining direction if one of the neighbors is unsafe or faulty;

if $x_{offset}=0$ and $y_{offset}<0$, and the neighbor along minimum paths of y− direction is safe, then the next hop is the $c_{y,1}-$ channel;

if $x_{offset}>0$ and $y_{offset}=0$, and the neighbor along minimum paths of x+ direction is safe, then the next hop is the $c_{x,1}+$ channel;

if $x_{offset}$ and, if $x_{offset}<0$ and $y_{offset}=0$, and packet of the class 8 occupies the $c_{x,2}-$ channel or the $c_{y,1}-$ channel, moreover, the neighbor along minimum paths of x− direction is safe, then the next hop is the $c_{x,2}-$ channel; otherwise, the neighbor along minimum paths is safe, then the next hop is the $c_{x,1}-$ channel;

and, wherein when minimum path neighbors are unsafe, and the packet occupies an x channel, the packet turns to the x*y+ virtual network; if minimum path neighbors are unsafe, and the packet occupies a y channel in this case, misroute the packet to a x channel until the y− channel is available, then the packet routes along the minimum path in the y− direction;

and, wherein when a packet falls in the x*y+ virtual network, it is delivered by using fault-tolerant adaptive routing, that includes:

if $x_{offset}>0$ and $y_{offset}>0$, and the packet occupies the $c_{x,1}+$ channel, moreover, both neighbors along minimum paths of x+ direction and y+ direction are safe, then the next hop is the $c_{x,1}+$ channel; otherwise, if the packet does not occupy the $c_{x,1}+$ channel, then the next hop is the $c_{x,1}+$ channel or a $c_{y,1}+$ channel, and the packet is delivered along remaining direction if one of the neighbors is unsafe or faulty;

if $x_{offset}<0$ and $y_{offset}>0$, and, both neighbors along minimum paths of x− direction and y+ direction are safe, then the next hop is the $c_{x,1}-$ channel or the $c_{y,1}+$ channel; the packet is delivered along remaining direction if one of the neighbors is unsafe or faulty;

if $x_{offset}=0$ and $y_{offset}>0$, and the neighbor along minimum paths of y+ direction is safe, then the next hop is the $c_{y,1}+$ channel;

if $x_{offset}>0$ and $y_{offset}=0$, and the neighbor along minimum paths of x+ direction is safe, then the next hop is the $c_{x,1}+$ channel;

and, if $x_{offset}<0$ and $y_{offset}=0$, and the neighbor along minimum paths of x− direction is safe, then the next hop is the $c_{x,1}-$ channel;

and, wherein when minimum path neighbors are unsafe, and the packet occupies an x channel, the packet turns to the x*y− virtual network; if minimum path neighbors are unsafe, and the packet occupies a y channel in this case, misroute the packet to a x channel until the y+ channel is available, then the packet routes along minimum path in the y+ direction;

and, wherein when a packet falls in the x−y* virtual network, it is delivered by using a fault-tolerant adaptive routing, that includes:

if $x_{offset}<0$ and $y_{offset}>0$, and the packet occupies the $c_{x,2-}$ channel, moreover, both neighbors along minimum paths of x− direction and y+ direction are safe, then the next hop is the $c_{x,2-}$ channel; otherwise, if the packet does not occupy the $c_{x,2-}$ channel, then the next hop is the $c_{x,2-}$ or a $c_{y,2+}$ channel, and the packet is delivered along remaining direction if one of the neighbors is unsafe or faulty;

if $x_{offset}<0$ and $y_{offset}<0$, and, both neighbors along minimum paths of x− direction and y− direction are safe, then the next hop is the $c_{x,2}-$ channel or a $c_{y,2}-$ channel; the packet is delivered along remaining direction if one of the neighbors is unsafe or faulty;

if $x_{offset}=0$ and $y_{offset}>0$, and the neighbor along minimum paths of y+ direction is safe, then the next hop is the $c_{y,2}+$ channel;

if $x_{offset}=0$ and $y_{offset}<0$, and the neighbor along minimum paths of y− direction is safe, then the next hop is the $c_{y,2}-$ channel;

and, if $x_{offset}<0$ and $y_{offset}=0$, and the neighbor along minimum paths of x− direction is safe, then the next hop is the $c_{x,2}-$ channel;

and, wherein when minimum path neighbors are unsafe, and the packet occupies a y channel, the packet turns to the x+y* virtual network; if the minimum path neighbors are unsafe, and the packet occupies an x channel in this case, misroute the packet to a y channel until the x− channel is available, then the packet routes along minimum path in the x− direction;

and, wherein when a packet falls in the x+y* virtual network, it is delivered by using a fault-tolerant adaptive routing, that includes:

if $x_{offset}>0$ and $y_{offset}<0$, and the packet occupies the $c_{y,2-}$ channel, moreover, both neighbors along minimum paths of x+ direction and y− direction are safe, then the next hop is the $c_{x,1}+$ channel or the $c_{y,2}-$ channel; the packet is delivered along remaining direction if one of the neighbors is unsafe or faulty;

if $x_{offset}>0$ and $y_{offset}<0$, and the packet occupies the $c_{x,1+}$ channel, moreover, both neighbors along minimum paths of x+ direction and y− direction are safe, then the next hop is the $c_{x,1+}$ channel or the $c_{y,2-}$ channel; the packet is delivered along remaining direction if one of the neighbors is unsafe or faulty;

if $x_{offset}>0$ and $y_{offset}<0$, and the packet occupies a $c_{x,2}+$ channel, moreover, both neighbors along minimum paths of x+ direction and y− direction are safe, then the next hop is the $c_{x,2}+$ channel or the $c_{y,2}-$ channel; the packet is delivered along remaining direction if one of the neighbors is unsafe or faulty;

if $x_{offset}>0$ and $y_{offset}>0$, and both neighbors along the minimum paths of x+ direction and y+ direction are safe, then the next hop is the $c_{x,2}+$ channel or the $c_{y,2}+$ channel; the packet is delivered along remaining direction if one of the neighbors is unsafe or faulty;

if $x_{offset}=0$ and $y_{offset}<0$, and the neighbor along minimum paths of y− direction is safe, then the next hop is the $c_{y,2}-$ channel;

if $x_{offset}=0$ and $y_{offset}>0$, and the neighbor along minimum paths of y+ direction is safe, then the next hop is the $c_{y,2}+$ channel;

and, if $x_{offset}>0$ and $y_{offset}=0$, and the packet of the class 3 occupies the $c_{x,1}+$ channel or the $c_{y,2}-$ channel, moreover, the neighbor along minimum paths of x+ direction is safe, then the next hop is the $c_{x,1}+$ channel; otherwise, the packet does not occupy the above stated channel, and the neighbor along the minimum paths is safe, then the next hop is the $c_{x,2}+$ channel;

wherein when the minimum path neighbors are unsafe, and the packet occupies a y channel, the packet turns to the x−y* virtual network; if the minimum path neighbors are unsafe, and the packet occupies an x channel in this case, misroute the packet along y direction until a minimum x+ channel is available, then the packet routes along the minimum path in the x+ direction.

6. An adaptive routing apparatus for two-dimensional mesh networks-on-chip, the adaptive routing apparatus comprising: a data storage; and a processor communicatively connected to the data storage, the processor being configured to use x dimension and y dimension to partition a two-dimensional mesh network into eight virtual sub-networks, according to offsets between a source node and a destination node of a packet along the x dimension or the y dimension;

set classes of the packet corresponding to each of the eight virtual sub-networks, then merging the eight virtual sub-networks into four virtual networks;

determine a class of the packet, according to the source node and destination node of the packet;

and, inject the packet into one of the four virtual networks to route based on the class of the packet;

wherein, a step of using x dimension and y dimension to partition a two-dimensional mesh network into eight virtual sub-networks includes:

partition the two-dimensional mesh network into eight virtual sub-networks as follows: (1) x+y+(1), (2) x+y+

(2), (3) x+y−(1), (4) x+y−(2), (5) x−y+(1), (6) x−y+(2), (7) x−y−(1), (8) x−y−(2); each conventional virtual network in a two-dimensional mesh appears twice in the eight sub-virtual networks, wherein packets are classified into eight classes according to the eight virtual sub-networks;

and, wherein a step of setting classes of the packets corresponding to each of the eight virtual sub-networks, includes:

according to the eight virtual sub-networks (1) x+y+(1), (2) x+y+(2), (3) x+y−(1), (4) x+y−(2), (5) x−y+(1), (6) x−y+(2), (7) x−y−(1), (8) x−y−(2), set classes of packets into eight classes;

considering a packet with offsets along x+ dimension and y+ dimension, setting the classes of the packet along x+ dimension and y+ dimension into class 1 and class 2, where the class 1 is x+y+(1), and the class 2 is x+y+(2);

considering a packet with offsets along x+ dimension and y− dimension, setting the classes of the packet along x+ dimension and y− dimension into class 3 and class 4, where the class 3 is x+y−(1), and the class 4 is x+y−(2);

considering a packet with offsets along x− dimension and y+ dimension, setting the classes of the packet along x− dimension and y+ dimension into class 5 and class 6, where the class 5 is x−y+(1), and the class 6 is x−y+(2);

and, considering a packet with offsets along x− dimension and y− dimension, setting the classes of the packet along x− dimension and y− dimension into class 7 and class 8, where the class 7 is x−y−(1), and the class 8 is x−y−(2);

and, wherein a step of merging the eight virtual sub-networks into four virtual networks includes:

merging the eight virtual sub-networks into four virtual networks as follows: (1) x*y−, (2) x*y+, (3) x−y*, (4) x+y*;

and, wherein a step of injecting the packet into one of the four virtual networks to route based on the class of the packet includes:

calculating a first offset along the x dimension and a second offset along the y dimension between the source node and the destination node of the packet;

wherein according to the first offset and the second offset, the packet is injected into a corresponding virtual network to route following these rules:

if the first offset and the second offset are both greater than zero, the packet is injected into x*y+ virtual network or x+y* virtual network;

if the first offset is greater than zero and the second offset is less than zero, the packet is injected into x*y− virtual network or x+y* virtual network;

if the first offset is less than zero and the second offset is greater than zero, the packet is injected into x*y+ virtual network or x−y* virtual network;

and, if the first offset and the second offset are both less than zero, the packet is injected into x*y− virtual network or x−y* virtual network;

and, after the step of merging the eight virtual sub-networks into four virtual networks, further comprising:

a physical x channel is assigned virtual channels $c_{x,1}$ and $c_{x,2}$, a y channel is assigned virtual channels $c_{y,1}$ and $c_{y,2}$;

then the four virtual networks are assigned these virtual channels: x*y−($c_{x,1}$,$c_{y,1}$−), x*y+($c_{x,1}$,$c_{y,1}$+), x−y* ($c_{x,2}$−,$c_{y,2}$), and x+y* ($c_{x,2}$+,$c_{y,2}$) for x and y channels in the four virtual networks;

the x*y− virtual networks and the x*y+ virtual networks are assigned the virtual channels $c_{x,1}$ along the x dimension, and the x−y* virtual networks and the x+y* virtual networks are assigned the virtual channels $c_{y,2}$ along the y dimension;

and, before a step of injecting the packet into one of the virtual networks to route based on the class of the packet further comprising:

setting deadlock-free routing algorithm rules for the packet to route in the virtual network;

and, according to the class of the packet and the deadlock-free routing algorithm rules, any packet can be routed with full adaptivity in the four virtual network.

7. The apparatus according to claim 6, wherein according to the eight virtual sub-networks: (1) x+y+(1), (2) x+y+(2), (3) x+y−(1), (4) x+y−(2), (5) x−y+(1), (6) x−y+(2), (7) x−y−(1), and (8) x−y−(2), set following rules for the deadlock-free routing algorithm, where two prevented turns and two special turns are set:

packets of the class 2 in the x*y+ virtual network of a first group are not allowed to turn to a $c_{y,1}$+ channel from a $c_{x,1}$+ channel;

packets of the class 5 in the x−y* virtual network of a second group are not allowed to turn to a $c_{y,2}$+ channel from a $c_{x,2}$− channel;

packets of the class 3 in the x+y* virtual network of the second group turn from a $c_{y,2}$− channel to a $c_{x,1}$+ channel, first, they change channel to the virtual network of the first group, and then when returning back to y− direction via the $c_{y,2}$− channel, change channel again to return back to the virtual network of the second group;

and, packets of the class 8 in the x*y− virtual network of the second group turn from a $c_{y,1}$− channel to a $c_{x,2}$− channel, first, they change channel to the virtual network of the second group, and then when returning back to the y direction via the $c_{y,1}$− channel, change channel again to return back to the virtual network of the first group.

8. The apparatus according to claim 6, wherein the processor is further configured to calculate offsets along x dimension and y dimension, which are the destination node relative to the source node, the first offset is $x_{offset}=x_d-x_s$, the second offset is $y_{offset}=y_d-y_s$, where $(x_s,y_s)$ and $(x_d,y_d)$ are coordinates of source node and destination node, respectively;

and, wherein when a packet falls in x*y− virtual network, it is delivered by using a deadlock-free fully adaptive routing, that includes:

if $x_{offset}<0$ and $y_{offset}<0$, and the packet occupies a $c_{y,1}$− channel, then the next hop is a $c_{x,2}$− channel or a $c_{y,2}$− channel;

if $x_{offset}<0$ and $y_{offset}<0$, and the packet occupies a $c_{x,1}$− channel, then the next hop is the $c_{x,1}$− channel or the $c_{y,1}$− channel;

if $x_{offset}<0$ and $y_{offset}<0$, and the packet occupies the $c_{x,2}$− channel, then the next hop is the $c_{x,2}$− channel or the $c_{y,1}$− channel;

if $x_{offset}>0$ and $y_{offset}<0$, then the next hop is a $c_{x,1}$+ channel or the $c_{y,1}$− channel;

if $x_{offset}=0$ and $y_{offset}<0$, then the next hop is the $c_{y,1}$− channel;

if $x_{offset}>0$ and $y_{offset}=0$, then the next hop is the $c_{x,1}$+ channel;

and, if $x_{offset}<0$ and $y_{offset}=0$, and packet of the class 8 occupies the $c_{y,1}-$ channel or the $c_{x,2}-$ channel, then the next hop is the $c_{x,2}-$ channel; otherwise the next hop is the $c_{x,1}-$ channel;

and, wherein when a packet falls in the x*y+ virtual network, it is delivered by using a deadlock-free adaptive routing, that includes:

if $x_{offset}>0$ and $y_{offset}>0$, and the packet occupies the $c_{x,1}+$ channel, then the next hop is the $c_{x,1}+$ channel; otherwise, the packet occupies a $c_{y,1}+$ channel, then the next hop is the $c_{x,1}+$ channel or the $c_{y,1}+$ channel;

if $x_{offset}<0$ and $y_{offset}>0$, then the next hop is the $c_{x,1}-$ channel or the $c_{y,1}+$ channel;

if $x_{offset}=0$ and $y_{offset}>0$, then the next hop is the $c_{y,1}+$ channel;

if $x_{offset}<0$ and $y_{offset}=0$, then the next hop is the $c_{x,1}-$ channel;

and, if $x_{offset}>0$ and $y_{offset}=0$, then the next hop is the $c_{x,1}+$ channel;

and, wherein when a packet falls in the x−y* virtual network, it is delivered by using a deadlock-free adaptive routing, that includes:

if $x_{offset}<0$ and $y_{offset}>0$, and the packet occupies the $c_{x,2}-$ channel, then the next hop is the $c_{x,2}-$ channel; otherwise, the packet occupies a $c_{y,2}+$ channel, then the next hop is the $c_{x,2}-$ channel or the $c_{y,2}+$ channel;

if $x_{offset}<0$ and $y_{offset}<0$, then the next hop is the $c_{x,2}-$ channel or the $c_{y,2}-$ channel;

if $x_{offset}=0$ and $y_{offset}>0$, then the next hop is the $c_{y,2}+$ channel;

if $x_{offset}=0$ and $y_{offset}<0$, then the next hop is the $c_{y,2}-$ channel;

and, if $x_{offset}<0$ and $y_{offset}=0$, then the next hop is the $c_{x,2}-$ channel;

and, wherein when a packet falls in x+y* virtual network, it is delivered by using a deadlock-free fully adaptive routing, that includes:

if $x_{offset}>0$ and $y_{offset}<0$, and the packet occupies the $c_{y,2}-$ channel, then the next hop is the $c_{x,1}+$ channel or the $c_{y,2}-$ channel;

if $x_{offset}>0$ and $y_{offset}<0$, and packet of the class 3 occupies a $c_{x,2}+$ channel, then the next hop is the $c_{x,2}+$ channel or the $c_{y,2}-$ channel;

if $x_{offset}>0$ and $y_{offset}<0$, and the packet occupies the $c_{x,1}+$ channel, then the next hop is the $c_{x,1}+$ channel or the $c_{y,2}-$ channel;

if $x_{offset}>0$ and $y_{offset}>0$, then the next hop is the $c_{x,2}+$ channel or the $c_{y,2}+$ channel;

if $x_{offset}=0$ and $y_{offset}<0$, then the next hop is the $c_{y,2}-$ channel;

if $x_{offset}=0$ and $y_{offset}>0$, then the next hop is the $c_{y,2}+$ channel;

and, if $x_{offset}>0$ and $y_{offset}=0$, and packet of the class 3 occupies a $c_{y,2}-$ channel or the $c_{x,1}+$ channel, then the next hop is the $c_{x,1}+$ channel; otherwise the next hop is the $c_{x,2}+$ channel.

9. The apparatus according to claim 6, wherein the processor is further configured to keep safety information of each of the four virtual networks before injecting the packet into a corresponding virtual network for routing, according to state of fault nodes in the two-dimensional mesh network, and, based on the class of the packet and the safety information, the packet is injected into a corresponding virtual network for a deadlock-free fully adaptive fault-tolerant routing;

wherein a step of setting safety information of each virtual network includes: any fault-free node is set to unsafe in a virtual network, if it has two faulty or unsafe neighbors along x dimension and y dimension;

each fault-free node keeps its state in the four virtual networks;

in addition, each fault-free node keeps safety information of its fault-free neighbors in all the four virtual networks;

therefore, 16 bits data at most should be kept at each fault-free router in a two-dimensional mesh networks-on-chip.

10. The apparatus according to claim 9, wherein the processor is further configured to calculate offsets along x dimension and y dimension which are a destination node relative to a source node;

wherein the first offset is $x_{offset}=x_d-x_s$, the second offset is $y_{offset}=yd-ys$, where $(x_s,y_s)$ and $(x_d,y_d)$ are coordinates of the source node and the destination node, respectively;

wherein when a packet falls in the x*y− virtual network, it is delivered by using a fault-tolerant adaptive routing, that includes:

if $x_{offset}<0$ and $y_{offset}<0$, and the packet occupies a $c_{y,1}-$ channel, moreover, both neighbors along minimum paths of x− direction and y− direction are safe, then the next hop is a $c_{x,2}-$ channel or the $c_{y,1}-$ channel; the packet is delivered along remaining direction if one of the neighbors is unsafe or faulty;

if $x_{offset}<0$ and $y_{offset}<0$, and the packet occupies a $c_{x,1}-$ channel, moreover, both neighbors along minimum paths of the x− direction and the y− direction are safe, then the next hop is the $c_{x,1}-$ channel or the $c_{y,1}-$ channel; the packet is delivered along remaining direction if one of the neighbors is unsafe or faulty;

if $x_{offset}<0$ and $y_{offset}<0$, and the packet occupies the $c_{x,2}-$ channel, moreover, both neighbors along minimum paths of x− direction and y− direction are safe, then the next hop is the $c_{x,2}-$ channel or the $c_{y,1}-$ channel; the packet is delivered along remaining direction if one of the neighbors is unsafe or faulty;

if $x_{offset}>0$ and $y_{offset}<0$, and both neighbors along minimum paths of x+ direction and y− direction are safe, then the next hop is a $c_{x,1}+$ channel or the $c_{y,1}-$ channel; the packet is delivered along remaining direction if one of the neighbors is unsafe or faulty;

if $x_{offset}=0$ and $y_{offset}<0$, and the neighbor along minimum paths of y− direction is safe, then the next hop is the $c_{y,1}-$ channel;

if $x_{offset}>0$ and $y_{offset}=0$, and the neighbor along minimum paths of x+ direction is safe, then the next hop is the $c_{x,1}+$ channel;

and, if $x_{offset}<0$ and $y_{offset}=0$, and packet of the class 8 occupies the $c_{x,2}-$ channel or the $c_{y,1}-$ channel, moreover, the neighbor along minimum paths of x− direction is safe, then the next hop is the $c_{x,2}-$ channel; otherwise, the neighbor along minimum paths is safe, then the next hop is the $c_{x,1}-$ channel;

and, wherein when minimum path neighbors are unsafe, and the packet occupies an x channel, the packet turns to the x*y+ virtual network; if minimum path neighbors are unsafe, and the packet occupies a y channel in this case, misroute the packet to a x channel until the y− channel is available, then the packet routes along the minimum path in the y− direction;

and, wherein when a packet falls in the x*y+ virtual network, it is delivered by using fault-tolerant adaptive routing, that includes:

if $x_{offset}>0$ and $y_{offset}>0$, and the packet occupies the $c_{x,1}+$ channel, moreover, both neighbors along minimum paths of x+ direction and y+ direction are safe, then the next hop is the $c_{x,1}+$ channel; otherwise, if the packet does not occupy the $c_{x,1}+$ channel, then the next hop is the $c_{x,1}+$ channel or a $c_{y,1}+$ channel, and the packet is delivered along remaining direction if one of the neighbors is unsafe or faulty;

if $x_{offset}<0$ and $y_{offset}>0$, and, both neighbors along minimum paths of x− direction and y+ direction are safe, then the next hop is the $c_{x,1}-$ channel or the $c_{y,1}+$ channel; the packet is delivered along remaining direction if one of the neighbors is unsafe or faulty;

if $x_{offset}=0$ and $y_{offset}>0$, and the neighbor along minimum paths of y+ direction is safe, then the next hop is the $c_{y,1}+$ channel;

if $x_{offset}>0$ and $y_{offset}=0$, and the neighbor along minimum paths of x+ direction is safe, then the next hop is the $c_{x,1}+$ channel;

and, if $x_{offset}<0$ and $y_{offset}=0$, and the neighbor along minimum paths of x− direction is safe, then the next hop is the $c_{x,1}-$ channel;

and, wherein when minimum path neighbors are unsafe, and the packet occupies an x channel, the packet turns to the x*y− virtual network; if minimum path neighbors are unsafe, and the packet occupies a y channel in this case, misroute the packet to a x channel until the y+ channel is available, then the packet routes along minimum path in the y+ direction;

and, wherein when a packet falls in the x−y* virtual network, it is delivered by using a fault-tolerant adaptive routing, that includes:

if $x_{offset}<0$ and $y_{offset}>0$, and the packet occupies the $c_{x,2-}$ channel, moreover, both neighbors along minimum paths of x− direction and y+ direction are safe, then the next hop is the $c_{x,2-}$ channel; otherwise, if the packet does not occupy the $c_{x,2-}$ channel, then the next hop is the $c_{x,2-}$ or a $c_{y,2+}$ channel, and the packet is delivered along remaining direction if one of the neighbors is unsafe or faulty;

if $x_{offset}<0$ and $y_{offset}<0$, and, both neighbors along minimum paths of x− direction and y− direction are safe, then the next hop is the $c_{x,2}-$ channel or a $c_{y,2}-$ channel; the packet is delivered along remaining direction if one of the neighbors is unsafe or faulty;

if $x_{offset}=0$ and $y_{offset}>0$, and the neighbor along minimum paths of y+ direction is safe, then the next hop is the $c_{y,2}+$ channel;

if $x_{offset}=0$ and $y_{offset}<0$, and the neighbor along minimum paths of y− direction is safe, then the next hop is the $c_{y,2}-$ channel;

and, if $x_{offset}<0$ and $y_{offset}=0$, and the neighbor along minimum paths of x− direction is safe, then the next hop is the $c_{x,2}-$ channel;

and, wherein when minimum path neighbors are unsafe, and the packet occupies a y channel, the packet turns to the x+y* virtual network; if the minimum path neighbors are unsafe, and the packet occupies an x channel in this case, misroute the packet to a y channel until the x− channel is available, then the packet routes along minimum path in the x− direction;

and, wherein when a packet falls in the x+y* virtual network, it is delivered by using a fault-tolerant adaptive routing, that includes:

if $x_{offset}>0$ and $y_{offset}<0$, and the packet occupies the $c_{y,2-}$ channel, moreover, both neighbors along minimum paths of x+ direction and y− direction are safe, then the next hop is the $c_{x,1}+$ channel or the $c_{y,2}-$ channel; the packet is delivered along remaining direction if one of the neighbors is unsafe or faulty;

if $x_{offset}>0$ and $y_{offset}<0$, and the packet occupies the $c_{x,1+}$ channel, moreover, both neighbors along minimum paths of x+ direction and y− direction are safe, then the next hop is the $c_{x,1+}$ channel or the $c_{y,2}-$ channel; the packet is delivered along remaining direction if one of the neighbors is unsafe or faulty;

if $x_{offset}>0$ and $y_{offset}<0$, and the packet occupies a $c_{x,2}+$ channel, moreover, both neighbors along minimum paths of x+ direction and y− direction are safe, then the next hop is the $c_{x,2}+$ channel or the $c_{y,2}-$ channel; the packet is delivered along remaining direction if one of the neighbors is unsafe or faulty;

if $x_{offset}>0$ and $y_{offset}>0$, and both neighbors along the minimum paths of x+ direction and y+ direction are safe, then the next hop is the $c_{x,2}+$ channel or the $c_{y,2}+$ channel; the packet is delivered along remaining direction if one of the neighbors is unsafe or faulty;

if $x_{offset}=0$ and $y_{offset}<0$, and the neighbor along minimum paths of y− direction is safe, then the next hop is the $c_{y,2}-$ channel;

if $x_{offset}=0$ and $y_{offset}>0$, and the neighbor along minimum paths of y+ direction is safe, then the next hop is the $c_{y,2}+$ channel;

and, if $x_{offset}>0$ and $y_{offset}=0$, and the packet of the class 3 occupies the $c_{x,1}+$ channel or the $c_{y,2}-$ channel, moreover, the neighbor along minimum paths of x+ direction is safe, then the next hop is the $c_{x,1}+$ channel; otherwise, the packet does not occupy the above stated channel, and the neighbor along the minimum paths is safe, then the next hop is the $c_{x,2}+$ channel;

wherein when the minimum path neighbors are unsafe, and the packet occupies a y channel, the packet turns to the x−y* virtual network; if the minimum path neighbors are unsafe, and the packet occupies an x channel in this case, misroute the packet along y direction until a minimum x+ channel is available, then the packet routes along the minimum path in the x+ direction.

11. An adaptive non-transitory computer storage medium for two-dimensional mesh networks-on-chip, which, when executed by computer, cause the computer to perform a method, the method comprising using x dimension and y dimension to partition a two-dimensional mesh network into eight virtual sub-networks, according to offsets between a source node and a destination node of a packet along the x dimension or the y dimension;

setting classes of the packet corresponding to each of the eight virtual sub-networks, then merging the eight virtual sub-networks into four virtual networks;

determining a class of the packet, according to the source node and destination node of the packet;

and, injecting the packet into one of the four virtual networks to route based on the class of the packet;

wherein, a step of using x dimension and y dimension to partition a two-dimensional mesh network into eight virtual sub-networks includes:

partitioning the two-dimensional mesh network into eight virtual sub-networks as follows: (1) x+y+(1), (2) x+y+(2), (3) x+y−(1), (4) x+y−(2), (5) x−y+(1), (6) x−y+(2), (7) x−y−(1), (8) x−y−(2); each conventional virtual network in a two-dimensional mesh appears twice in the eight sub-virtual networks, wherein packets are classified into eight classes according to the eight virtual sub-networks;

and, wherein a step of setting classes of the packets corresponding to each of the eight virtual sub-networks, includes:

according to the eight virtual sub-networks (1) x+y+(1), (2) x+y+(2), (3) x+y−(1), (4) x+y−(2), (5) x−y+(1), (6) x−y+(2), (7) x−y−(1), (8) x−y−(2), set classes of packets into eight classes;

considering a packet with offsets along x+ dimension and y+ dimension, setting the classes of the packet along x+ dimension and y+ dimension into class 1 and class 2, where the class 1 is x+y+(1), and the class 2 is x+y+(2);

considering a packet with offsets along x+ dimension and y− dimension, setting the classes of the packet along x+ dimension and y− dimension into class 3 and class 4, where the class 3 is x+y−(1), and the class 4 is x+y−(2);

considering a packet with offsets along x− dimension and y+ dimension, setting the classes of the packet along x− dimension and y+ dimension into class 5 and class 6, where the class 5 is x−y+(1), and the class 6 is x−y+(2);

and, considering a packet with offsets along x− dimension and y− dimension, setting the classes of the packet along x− dimension and y− dimension into class 7 and class 8, where the class 7 is x−y−(1), and the class 8 is x−y−(2);

and, wherein a step of merging the eight virtual sub-networks into four virtual networks includes:

merging the eight virtual sub-networks into four virtual networks as follows: (1) x*y−, (2) x*y+, (3) x−y*, (4) x+y*;

and, wherein a step of injecting the packet into one of the four virtual networks to route based on the class of the packet includes:

calculating a first offset along the x dimension and a second offset along the y dimension between the source node and the destination node of the packet;

wherein according to the first offset and the second offset, the packet is injected into a corresponding virtual network to route following these rules:

if the first offset and the second offset are both greater than zero, the packet is injected into x*y+ virtual network or x+y* virtual network;

if the first offset is greater than zero and the second offset is less than zero, the packet is injected into x*y− virtual network or x+y* virtual network;

if the first offset is less than zero and the second offset is greater than zero, the packet is injected into x*y+ virtual network or x−y* virtual network;

and, if the first offset and the second offset are both less than zero, the packet is injected into x*y− virtual network or x−y* virtual network;

and, after the step of merging the eight virtual sub-networks into four virtual networks, further comprising:

a physical x channel is assigned virtual channels $c_{x,1}$ and $c_{x,2}$, a y channel is assigned virtual channels $c_{y,1}$ and $c_{y,2}$;

then the four virtual networks are assigned these virtual channels: x*y−($c_{x,1}$,$c_{y,1}$−), x*y+($c_{x,1}$,$c_{y,1}$+), x−y* ($c_{x,2}$−,$c_{y,2}$), and x+y* ($c_{x,2}$+,$c_{y,2}$) for x and y channels in the four virtual networks;

the x*y− virtual networks and the x*y+ virtual networks are assigned the virtual channels $c_{x,1}$ along the x dimension, and the x−y* virtual networks and the x+y* virtual networks are assigned the virtual channels $c_{y,2}$ along the y dimension;

and, before a step of injecting the packet into one of the virtual networks to route based on the class of the packet further comprising:

setting deadlock-free routing algorithm rules for the packet to route in the virtual network;

and, according to the class of the packet and the deadlock-free routing algorithm rules, any packet can be routed with full adaptivity in the four virtual network.

12. The computer storage medium according to claim 11, wherein according to the eight virtual sub-networks: (1) x+y+(1), (2) x+y+(2), (3) x+y−(1), (4) x+y−(2), (5) x−y+(1), (6) x−y+(2), (7) x−y−(1), and (8) x−y−(2), set following rules for the deadlock-free routing algorithm, where two prevented turns and two special turns are set:

packets of the class 2 in the x*y+ virtual network of a first group are not allowed to turn to a $c_{y,1}$+ channel from a $c_{x,1}$+ channel;

packets of the class 5 in the x−y* virtual network of a second group are not allowed to turn to a $c_{y,2}$+ channel from a $c_{x,2}$− channel;

packets of the class 3 in the x+y* virtual network of the second group turn from a $c_{y,2}$− channel to a $c_{x,1}$+ channel, first, they change channel to the virtual network of the first group, and then when returning back to y− direction via the $c_{y,2}$− channel, change channel again to return back to the virtual network of the second group;

and, packets of the class 8 in the x*y− virtual network of the second group turn from a $c_{y,1}$− channel to a $c_{x,2}$− channel, first, they change channel to the virtual network of the second group, and then when returning back to the y direction via the $c_{y,1}$− channel, change channel again to return back to the virtual network of the first group.

13. The computer storage medium according to claim 12, further comprising:

calculating offsets along x dimension and y dimension, which are the destination node relative to the source node, the first offset is $x_{offset}=x_d-x_s$, the second offset is $y_{offset}=y_d-y_s$, where $(x_s,y_s)$ and $(x_d,y_d)$ are coordinates of source node and destination node, respectively;

and, wherein when a packet falls in x*y− virtual network, it is delivered by using a deadlock-free fully adaptive routing, that includes:

if $x_{offset}<0$ and $y_{offset}<0$, and the packet occupies a $c_{y,1}$− channel, then the next hop is a $c_{x,2}$− channel or a $c_{y,2}$− channel;

if $x_{offset}<0$ and $y_{offset}<0$, and the packet occupies a $c_{x,1}$− channel, then the next hop is the $c_{x,1}$− channel or the $c_{y,1}$− channel;

if $x_{offset}<0$ and $y_{offset}<0$, and the packet occupies the $c_{x,2}$− channel, then the next hop is the $c_{x,2}$− channel or the $c_{y,1}$− channel;

if $x_{offset}>0$ and $y_{offset}<0$, then the next hop is a $c_{x,1}$+ channel or the $c_{y,1}$− channel;

if $x_{offset}=0$ and $y_{offset}<0$, then the next hop is the $c_{y,1}$− channel;

if $x_{offset}>0$ and $y_{offset}=0$, then the next hop is the $c_{x,1}$+ channel;

and, if $x_{offset}<0$ and $y_{offset}=0$, and packet of the class 8 occupies the $c_{y,1}$− channel or the $c_{x,2}$− channel, then the next hop is the $c_{x,2}$− channel; otherwise the next hop is the $c_{x,1}$− channel;

and, wherein when a packet falls in the x*y+ virtual network, it is delivered by using a deadlock-free adaptive routing, that includes:

if $x_{offset}>0$ and $y_{offset}>0$, and the packet occupies the $c_{x,1}+$ channel, then the next hop is the $c_{x,1}+$ channel; otherwise, the packet occupies a $c_{y,1}+$ channel, then the next hop is the $c_{x,1}+$ channel or the $c_{y,1}+$ channel;

if $x_{offset}<0$ and $y_{offset}>0$, then the next hop is the $c_{x,1}-$ channel or the $c_{y,1}+$ channel;

if $x_{offset}=0$ and $y_{offset}>0$, then the next hop is the $c_{y,1}+$ channel;

if $x_{offset}<0$ and $y_{offset}=0$, then the next hop is the $c_{x,1}-$ channel;

and, if $x_{offset}>0$ and $y_{offset}=0$, then the next hop is the $c_{x,1}+$ channel;

and, wherein when a packet falls in the x–y* virtual network, it is delivered by using a deadlock-free adaptive routing, that includes:

if $x_{offset}<0$ and $y_{offset}>0$, and the packet occupies the $c_{x,2}-$ channel, then the next hop is the $c_{x,2}-$ channel; otherwise, the packet occupies a $c_{y,2}+$ channel, then the next hop is the $c_{x,2}-$ channel or the $c_{y,2}+$ channel;

if $x_{offset}<0$ and $y_{offset}<0$, then the next hop is the $c_{x,2}-$ channel or the $c_{y,2}-$ channel;

if $x_{offset}=0$ and $y_{offset}>0$, then the next hop is the $c_{y,2}+$ channel;

if $x_{offset}=0$ and $y_{offset}<0$, then the next hop is the $c_{y,2}-$ channel;

and, if $x_{offset}<0$ and $y_{offset}=0$, then the next hop is the $c_{x,2}-$ channel;

and, wherein when a packet falls in x+y* virtual network, it is delivered by using a deadlock-free fully adaptive routing, that includes:

if $x_{offset}>0$ and $y_{offset}<0$, and the packet occupies the $c_{y,2}-$ channel, then the next hop is the $c_{x,1}+$ channel or the $c_{y,2}-$ channel;

if $x_{offset}>0$ and $y_{offset}<0$, and packet of the class 3 occupies a $c_{x,2}+$ channel, then the next hop is the $c_{x,2}+$ channel or the $c_{y,2}-$ channel;

if $x_{offset}>0$ and $y_{offset}<0$, and the packet occupies the $c_{x,1}+$ channel, then the next hop is the $c_{x,1}+$ channel or the $c_{y,2}-$ channel;

if $x_{offset}>0$ and $y_{offset}>0$, then the next hop is the $c_{x,2}+$ channel or the $c_{y,2}+$ channel;

if $x_{offset}=0$ and $y_{offset}<0$, then the next hop is the $c_{y,2}-$ channel;

if $x_{offset}=0$ and $y_{offset}>0$, then the next hop is the $c_{y,2}+$ channel;

and, if $x_{offset}>0$ and $y_{offset}=0$, and packet of the class 3 occupies a $c_{y,2}-$ channel or the $c_{x,1}+$ channel, then the next hop is the $c_{x,1}+$ channel; otherwise the next hop is the $c_{x,2}+$ channel.

14. The computer storage medium according to claim 11, further comprising: according to state of fault nodes in the two-dimensional mesh network, keep safety information of each of the four virtual networks, before injecting the packet into a corresponding virtual network for routing, and, based on the class of the packet and the safety information, the packet is injected into a corresponding virtual network for a deadlock-free fully adaptive fault-tolerant routing;

wherein a step of setting safety information of each virtual network includes: any fault-free node is set to unsafe in a virtual network, if it has two faulty or unsafe neighbors along x dimension and y dimension;

each fault-free node keeps its state in the four virtual networks;

in addition, each fault-free node keeps safety information of its fault-free neighbors in all the four virtual networks;

therefore, 16 bits data at most should be kept at each fault-free router in a two-dimensional mesh networks-on-chip.

15. The computer storage medium according to claim 14, further comprising:

calculating offsets along x dimension and y dimension which are a destination node relative to a source node;

wherein the first offset is $x_{offset}=x_d-x_s$, the second offset is $y_{offset}=yd-ys$, where $(x_s,y_s)$ and $(x_d,y_d)$ are coordinates of the source node and the destination node, respectively;

wherein when a packet falls in the x*y– virtual network, it is delivered by using a fault-tolerant adaptive routing, that includes:

if $x_{offset}<0$ and $y_{offset}<0$, and the packet occupies a $c_{y,1}-$ channel, moreover, both neighbors along minimum paths of x– direction and y– direction are safe, then the next hop is a $c_{x,2}-$ channel or the $c_{y,1}-$ channel; the packet is delivered along remaining direction if one of the neighbors is unsafe or faulty;

if $x_{offset}<0$ and $y_{offset}<0$, and the packet occupies a $c_{x,1}-$ channel, moreover, both neighbors along minimum paths of the x– direction and the y– direction are safe, then the next hop is the $c_{x,1}-$ channel or the $c_{y,1}-$ channel; the packet is delivered along remaining direction if one of the neighbors is unsafe or faulty;

if $x_{offset}<0$ and $y_{offset}<0$, and the packet occupies the $c_{x,2}-$ channel, moreover, both neighbors along minimum paths of x– direction and y– direction are safe, then the next hop is the $c_{x,2}-$ channel or the $c_{y,1}-$ channel; the packet is delivered along remaining direction if one of the neighbors is unsafe or faulty;

if $x_{offset}>0$ and $y_{offset}<0$, and both neighbors along minimum paths of x+ direction and y– direction are safe, then the next hop is a $c_{x,1}+$ channel or the $c_{y,1}-$ channel; the packet is delivered along remaining direction if one of the neighbors is unsafe or faulty;

if $x_{offset}=0$ and $y_{offset}<0$, and the neighbor along minimum paths of y– direction is safe, then the next hop is the $c_{y,1}-$ channel;

if $x_{offset}>0$ and $y_{offset}=0$, and the neighbor along minimum paths of x+ direction is safe, then the next hop is the $c_{x,1}+$ channel;

and, if $x_{offset}<0$ and $y_{offset}=0$, and packet of the class 8 occupies the $c_{x,2}-$ channel or the $c_{y,1}-$ channel, moreover, the neighbor along minimum paths of x– direction is safe, then the next hop is the $c_{x,2}-$ channel; otherwise, the neighbor along minimum paths is safe, then the next hop is the $c_{x,1}-$ channel;

and, wherein when minimum path neighbors are unsafe, and the packet occupies an x channel, the packet turns to the x*y+ virtual network; if minimum path neighbors are unsafe, and the packet occupies a y channel in this case, misroute the packet to a x channel until the y– channel is available, then the packet routes along the minimum path in the y– direction;

and, wherein when a packet falls in the x*y+ virtual network, it is delivered by using fault-tolerant adaptive routing, that includes:

if $x_{offset}>0$ and $y_{offset}>0$, and the packet occupies the $c_{x,1}+$ channel, moreover, both neighbors along minimum paths of x+ direction and y+ direction are safe, then the next hop is the $c_{x,1}+$ channel; otherwise, if the packet does not occupy the $c_{x,1}+$ channel, then the next hop is the $c_{x,1}+$ channel or a $c_{y,1}+$ channel, and the packet is delivered along remaining direction if one of the neighbors is unsafe or faulty;

if $x_{offset} < 0$ and $y_{offset} > 0$, and, both neighbors along minimum paths of x− direction and y+ direction are safe, then the next hop is the $c_{x,1}$− channel or the $c_{y,1}+$ channel; the packet is delivered along remaining direction if one of the neighbors is unsafe or faulty;

if $x_{offset} = 0$ and $y_{offset} > 0$, and the neighbor along minimum paths of y+ direction is safe, then the next hop is the $c_{y,1}+$ channel;

if $x_{offset} > 0$ and $y_{offset} = 0$, and the neighbor along minimum paths of x+ direction is safe, then the next hop is the $c_{x,1}+$ channel;

and, if $x_{offset} < 0$ and $y_{offset} = 0$, and the neighbor along minimum paths of x− direction is safe, then the next hop is the $c_{x,1}$− channel;

and, wherein when minimum path neighbors are unsafe, and the packet occupies an x channel, the packet turns to the x*y− virtual network; if minimum path neighbors are unsafe, and the packet occupies a y channel in this case, misroute the packet to a x channel until the y+ channel is available, then the packet routes along minimum path in the y+ direction;

and, wherein when a packet falls in the x−y* virtual network, it is delivered by using a fault-tolerant adaptive routing, that includes:

if $x_{offset} < 0$ and $y_{offset} > 0$, and the packet occupies the $c_{x,2-}$ channel, moreover, both neighbors along minimum paths of x− direction and y+ direction are safe, then the next hop is the $c_{x,2}$− channel; otherwise, if the packet does not occupy the $c_{x,2-}$ channel, then the next hop is the $c_{x,2-}$ or a $c_{y,2+}$ channel, and the packet is delivered along remaining direction if one of the neighbors is unsafe or faulty;

if $x_{offset} < 0$ and $y_{offset} < 0$, and, both neighbors along minimum paths of x− direction and y− direction are safe, then the next hop is the $c_{x,2}$− channel or a $c_{y,2}$− channel; the packet is delivered along remaining direction if one of the neighbors is unsafe or faulty;

if $x_{offset} = 0$ and $y_{offset} > 0$, and the neighbor along minimum paths of y+ direction is safe, then the next hop is the $c_{y,2}+$ channel;

if $x_{offset} = 0$ and $y_{offset} < 0$, and the neighbor along minimum paths of y− direction is safe, then the next hop is the $c_{y,2}$− channel;

and, if $x_{offset} < 0$ and $y_{offset} = 0$, and the neighbor along minimum paths of x− direction is safe, then the next hop is the $c_{x,2}$− channel;

and, wherein when minimum path neighbors are unsafe, and the packet occupies a y channel, the packet turns to the x+y* virtual network; if the minimum path neighbors are unsafe, and the packet occupies an x channel in this case, misroute the packet to a y channel until the x− channel is available, then the packet routes along minimum path in the x− direction;

and, wherein when a packet falls in the x+y* virtual network, it is delivered by using a fault-tolerant adaptive routing, that includes:

if $x_{offset} > 0$ and $y_{offset} < 0$, and the packet occupies the $c_{y,2-}$ channel, moreover, both neighbors along minimum paths of x+ direction and y− direction are safe, then the next hop is the $c_{x,1}+$ channel or the $c_{y,2}$− channel; the packet is delivered along remaining direction if one of the neighbors is unsafe or faulty;

if $x_{offset} > 0$ and $y_{offset} < 0$, and the packet occupies the $c_{x,1+}$ channel, moreover, both neighbors along minimum paths of x+ direction and y− direction are safe, then the next hop is the $c_{x,1+}$ channel or the $c_{y,2-}$ channel; the packet is delivered along remaining direction if one of the neighbors is unsafe or faulty;

if $x_{offset} > 0$ and $y_{offset} < 0$, and the packet occupies a $c_{x,2}+$ channel, moreover, both neighbors along minimum paths of x+ direction and y− direction are safe, then the next hop is the $c_{x,2}+$ channel or the $c_{y,2}$− channel; the packet is delivered along remaining direction if one of the neighbors is unsafe or faulty;

if $x_{offset} > 0$ and $y_{offset} > 0$, and both neighbors along the minimum paths of x+ direction and y+ direction are safe, then the next hop is the $c_{x,2}+$ channel or the $c_{y,2}+$ channel; the packet is delivered along remaining direction if one of the neighbors is unsafe or faulty;

if $x_{offset} = 0$ and $y_{offset} < 0$, and the neighbor along minimum paths of y− direction is safe, then the next hop is the $c_{y,2}$− channel;

if $x_{offset} = 0$ and $y_{offset} > 0$, and the neighbor along minimum paths of y+ direction is safe, then the next hop is the $c_{y,2}+$ channel;

and, if $x_{offset} > 0$ and $y_{offset} = 0$, and the packet of the class 3 occupies the $c_{x,1}+$ channel or the $c_{y,2}$− channel, moreover, the neighbor along minimum paths of x+ direction is safe, then the next hop is the $c_{x,1}+$ channel; otherwise, the packet does not occupy the above stated channel, and the neighbor along the minimum paths is safe, then the next hop is the $c_{x,2}+$ channel;

wherein when the minimum path neighbors are unsafe, and the packet occupies a y channel, the packet turns to the x−y* virtual network; if the minimum path neighbors are unsafe, and the packet occupies an x channel in this case, misroute the packet along y direction until a minimum x+ channel is available, then the packet routes along the minimum path in the x+ direction.

* * * * *